United States Patent
Bruce et al.

(10) Patent No.: US 9,952,991 B1
(45) Date of Patent: Apr. 24, 2018

(54) SYSTEMATIC METHOD ON QUEUING OF DESCRIPTORS FOR MULTIPLE FLASH INTELLIGENT DMA ENGINE OPERATION

(71) Applicant: BiTMICRO Networks, Inc., Fremont, CA (US)

(72) Inventors: Ricardo H. Bruce, Fremont, CA (US); Marlon B. Verdan, Paranaque (PH); Rowenah Michelle Jago-on, Cagayan de Oro (PH)

(73) Assignee: BiTMICRO Networks, Inc., Fremont, CA (US)

( * ) Notice: Subject to any disclaimer, the term of this patent is extended or adjusted under 35 U.S.C. 154(b) by 135 days.

(21) Appl. No.: 14/690,339

(22) Filed: Apr. 17, 2015

Related U.S. Application Data

(63) Continuation of application No. 61/980,640, filed on Apr. 17, 2014.

(51) Int. Cl.
*G06F 5/12* (2006.01)
*G06F 13/28* (2006.01)
(Continued)

(52) U.S. Cl.
CPC ............... *G06F 13/28* (2013.01); *G06F 5/12* (2013.01); *G06F 5/14* (2013.01); *G06F 13/4068* (2013.01); *H04L 47/10* (2013.01)

(58) Field of Classification Search
CPC .... G06F 3/0659; G06F 12/1081; G06F 13/28; G06F 13/30; G06F 5/12; G06F 5/14;
(Continued)

(56) References Cited

U.S. PATENT DOCUMENTS

| 4,402,040 A | 8/1983 | Evett |
|---|---|---|
| 4,403,283 A | 9/1983 | Myntti et al. |

(Continued)

FOREIGN PATENT DOCUMENTS

| JP | 2005142859 A | 6/2005 |
|---|---|---|
| JP | 2005-309847 | 11/2005 |

(Continued)

OTHER PUBLICATIONS

Office Action dated Sep. 29, 2017 for U.S. Appl. No. 14/690,349.
(Continued)

*Primary Examiner* — Glenn A Auve

(57) ABSTRACT

In an embodiment of the invention, a method comprises: fetching a first set of descriptors from a memory device and writing the first set of descriptors to a buffer; retrieving the first set of descriptors from the buffer and processing the first set of descriptors to permit a Direct Memory Access (DMA) operation; and if space is available in the buffer, fetching a second set of descriptors from the memory device and writing the second set of descriptors to the buffer during or after the processing of the first set of descriptors. In another embodiment of the invention, an apparatus comprises: a fetching module configured to fetch a first set of descriptors from a memory device and to write the first set of descriptors to a buffer; a sequencer configured to retrieve the first set of descriptors from the buffer and to process the first set of descriptors to permit a Direct Memory Access (DMA) operation; and wherein if space is available in the buffer, the fetching module is configured to fetch a second set of descriptors from the memory device and to write the second set of descriptors to the buffer during or after the processing of the first set of descriptors.

17 Claims, 9 Drawing Sheets

(51) Int. Cl.
  *G06F 13/40* (2006.01)
  *H04L 12/801* (2013.01)
  *G06F 5/14* (2006.01)

(58) Field of Classification Search
  CPC .............. G06F 3/0656; G06F 13/1673; G06F 13/4059; G06F 2205/126; H04L 47/10
  USPC .............................................. 710/22–24, 29
  See application file for complete search history.

(56) References Cited

U.S. PATENT DOCUMENTS

| | | |
|---|---|---|
| 4,752,871 A | 6/1988 | Sparks |
| 4,967,344 A | 10/1990 | Scavezze et al. |
| 5,111,058 A | 5/1992 | Martin |
| RE34,100 E | 10/1992 | Hartness |
| 5,222,046 A | 6/1993 | Kreifels et al. |
| 5,297,148 A | 3/1994 | Harari et al. |
| 5,339,404 A | 8/1994 | Vandling, III |
| 5,341,339 A | 8/1994 | Wells |
| 5,371,709 A | 12/1994 | Fisher et al. |
| 5,379,401 A | 1/1995 | Robinson et al. |
| 5,388,083 A | 2/1995 | Assar et al. |
| 5,396,468 A | 3/1995 | Harari et al. |
| 5,406,529 A | 4/1995 | Asano |
| 5,432,748 A | 7/1995 | Hsu et al. |
| 5,448,577 A | 9/1995 | Wells et al. |
| 5,459,850 A | 10/1995 | Clay et al. |
| 5,479,638 A | 12/1995 | Assar et al. |
| 5,485,595 A | 1/1996 | Assar et al. |
| 5,488,711 A | 1/1996 | Hewitt et al. |
| 5,500,826 A | 3/1996 | Hsu et al. |
| 5,509,134 A | 4/1996 | Fandrich et al. |
| 5,513,138 A | 4/1996 | Manabe et al. |
| 5,524,231 A | 6/1996 | Brown |
| 5,530,828 A | 6/1996 | Kaki et al. |
| 5,535,328 A | 7/1996 | Harari et al. |
| 5,535,356 A | 7/1996 | Kim et al. |
| 5,542,042 A | 7/1996 | Manson |
| 5,542,082 A | 7/1996 | Solhjell |
| 5,548,741 A | 8/1996 | Watanabe |
| 5,559,956 A | 9/1996 | Sukegawa |
| 5,568,423 A | 10/1996 | Jou et al. |
| 5,568,439 A | 10/1996 | Harari |
| 5,572,466 A | 11/1996 | Sukegawa |
| 5,594,883 A | 1/1997 | Pricer |
| 5,602,987 A | 2/1997 | Harari et al. |
| 5,603,001 A | 2/1997 | Sukegawa et al. |
| 5,606,529 A | 2/1997 | Honma et al. |
| 5,606,532 A | 2/1997 | Lambrache et al. |
| 5,619,470 A | 4/1997 | Fukumoto |
| 5,627,783 A | 5/1997 | Miyauchi |
| 5,640,349 A | 6/1997 | Kakinuma et al. |
| 5,644,784 A | 7/1997 | Peek |
| 5,682,509 A | 10/1997 | Kabenjian |
| 5,708,814 A | 1/1998 | Short et al. |
| 5,737,742 A | 4/1998 | Achiwa et al. |
| 5,765,023 A * | 6/1998 | Leger ...................... G06F 13/28 710/22 |
| 5,787,466 A | 7/1998 | Berliner |
| 5,796,182 A | 8/1998 | Martin |
| 5,799,200 A | 8/1998 | Brant et al. |
| 5,802,554 A | 9/1998 | Caceres et al. |
| 5,818,029 A | 10/1998 | Thomson |
| 5,819,307 A | 10/1998 | Iwamoto et al. |
| 5,822,251 A | 10/1998 | Bruce et al. |
| 5,864,653 A | 1/1999 | Tavallaei et al. |
| 5,870,627 A * | 2/1999 | O'Toole .................. G06F 13/28 710/22 |
| 5,875,351 A | 2/1999 | Riley |
| 5,881,264 A | 3/1999 | Kurosawa |
| 5,913,215 A | 6/1999 | Rubinstein et al. |
| 5,918,033 A | 6/1999 | Heeb et al. |
| 5,930,481 A | 7/1999 | Benhase |
| 5,933,849 A | 8/1999 | Srbljic et al. |
| 5,943,421 A | 8/1999 | Grabon |
| 5,956,743 A | 9/1999 | Bruce et al. |
| 5,978,866 A | 11/1999 | Nain |
| 5,987,621 A | 11/1999 | Duso |
| 6,000,006 A | 12/1999 | Bruce |
| 6,014,709 A | 1/2000 | Gulick et al. |
| 6,076,137 A | 6/2000 | Asnaashari |
| 6,098,119 A | 8/2000 | Surugucchi et al. |
| 6,128,303 A | 10/2000 | Bergantino |
| 6,138,200 A | 10/2000 | Ogilvie |
| 6,138,247 A | 10/2000 | McKay et al. |
| 6,151,641 A | 11/2000 | Herbert |
| 6,215,875 B1 | 4/2001 | Nohda |
| 6,230,269 B1 | 5/2001 | Spies et al. |
| 6,298,071 B1 | 10/2001 | Taylor et al. |
| 6,341,342 B1 | 1/2002 | Thompson et al. |
| 6,363,441 B1 | 3/2002 | Beniz et al. |
| 6,363,444 B1 | 3/2002 | Platko et al. |
| 6,397,267 B1 | 5/2002 | Chong, Jr. |
| 6,404,772 B1 | 6/2002 | Beach et al. |
| 6,452,602 B1 * | 9/2002 | Morein ................ H04N 19/176 345/536 |
| 6,496,939 B2 | 12/2002 | Portman et al. |
| 6,526,506 B1 | 2/2003 | Lewis |
| 6,529,416 B2 | 3/2003 | Bruce et al. |
| 6,557,095 B1 | 4/2003 | Henstrom |
| 6,574,142 B2 | 6/2003 | Gelke |
| 6,601,126 B1 | 7/2003 | Zaidi et al. |
| 6,678,754 B1 | 1/2004 | Soulier |
| 6,728,840 B1 | 4/2004 | Shatil |
| 6,744,635 B2 | 6/2004 | Portman et al. |
| 6,785,746 B1 | 8/2004 | Mahmoud et al. |
| 6,757,845 B2 | 12/2004 | Bruce |
| 6,857,076 B1 | 2/2005 | Klein |
| 6,901,499 B2 | 5/2005 | Aasheim et al. |
| 6,922,391 B1 | 7/2005 | King et al. |
| 6,961,805 B2 | 11/2005 | Lakhani et al. |
| 6,963,946 B1 | 11/2005 | Dwork et al. |
| 6,970,446 B2 | 11/2005 | Krischar et al. |
| 6,970,890 B1 | 11/2005 | Bruce et al. |
| 6,973,546 B2 | 12/2005 | Johnson |
| 6,980,795 B1 | 12/2005 | Hermann et al. |
| 7,103,684 B2 | 9/2006 | Chen et al. |
| 7,174,438 B2 | 2/2007 | Homma et al. |
| 7,194,766 B2 | 3/2007 | Noehring et al. |
| 7,263,006 B2 | 8/2007 | Aritome |
| 7,283,629 B2 | 10/2007 | Kaler et al. |
| 7,305,548 B2 | 12/2007 | Pierce et al. |
| 7,330,954 B2 | 2/2008 | Nangle |
| 7,372,962 B2 | 6/2008 | Fujimoto et al. |
| 7,386,662 B1 | 6/2008 | Kekre et al. |
| 7,412,631 B2 | 8/2008 | Uddenberg et al. |
| 7,415,549 B2 | 8/2008 | Vemula et al. |
| 7,424,553 B1 | 9/2008 | Borrelli et al. |
| 7,430,650 B1 | 9/2008 | Ross |
| 7,474,926 B1 | 1/2009 | Carr et al. |
| 7,478,186 B1 | 1/2009 | Onufryk et al. |
| 7,490,177 B2 | 2/2009 | Kao |
| 7,496,699 B2 * | 2/2009 | Pope ....................... G06F 13/28 710/22 |
| 7,500,063 B2 | 3/2009 | Zohar et al. |
| 7,506,098 B2 | 3/2009 | Arcedera et al. |
| 7,613,876 B2 | 11/2009 | Bruce et al. |
| 7,620,748 B1 | 11/2009 | Bruce et al. |
| 7,620,749 B2 * | 11/2009 | Biran ..................... G06F 13/28 710/22 |
| 7,624,239 B2 | 11/2009 | Bennett et al. |
| 7,636,801 B1 | 12/2009 | Kekre et al. |
| 7,660,941 B2 | 2/2010 | Lee et al. |
| 7,668,925 B1 | 2/2010 | Liao et al. |
| 7,676,640 B2 | 3/2010 | Chow |
| 7,681,188 B1 | 3/2010 | Tirumalai et al. |
| 7,716,389 B1 | 5/2010 | Bruce et al. |
| 7,719,287 B2 | 5/2010 | Marks et al. |
| 7,729,370 B1 | 6/2010 | Orcine et al. |
| 7,743,202 B2 | 6/2010 | Tsai et al. |
| 7,765,359 B2 | 7/2010 | Kang et al. |
| 7,877,639 B2 | 1/2011 | Hoang |
| 7,913,073 B2 | 3/2011 | Choi |

(56) References Cited

U.S. PATENT DOCUMENTS

| | | |
|---|---|---|
| 7,921,237 B1 | 4/2011 | Holland et al. |
| 7,934,052 B2 | 4/2011 | Prins et al. |
| 7,958,295 B1 | 6/2011 | Liao et al. |
| 7,979,614 B1 | 7/2011 | Yang |
| 7,996,581 B2* | 8/2011 | Bond ............... G06F 13/30 710/20 |
| 8,010,740 B2 | 10/2011 | Arcedera et al. |
| 8,032,700 B2 | 10/2011 | Bruce et al. |
| 8,156,279 B2 | 4/2012 | Tanaka et al. |
| 8,156,320 B2 | 4/2012 | Borras |
| 8,161,223 B1 | 4/2012 | Chamseddine et al. |
| 8,165,301 B1 | 4/2012 | Bruce et al. |
| 8,200,879 B1 | 6/2012 | Falik et al. |
| 8,219,719 B1 | 7/2012 | Parry et al. |
| 8,225,022 B2 | 7/2012 | Caulkins |
| 8,341,300 B1 | 12/2012 | Karamcheti |
| 8,341,311 B1 | 12/2012 | Szewerenko et al. |
| 8,375,257 B2 | 2/2013 | Hong et al. |
| 8,447,908 B2 | 4/2013 | Bruce et al. |
| 8,489,914 B2 | 7/2013 | Cagno |
| 8,510,631 B2 | 8/2013 | Wu et al. |
| 8,560,804 B2 | 10/2013 | Bruce et al. |
| 8,583,868 B2 | 11/2013 | Belluomini et al. |
| 8,677,042 B2 | 3/2014 | Gupta et al. |
| 8,707,134 B2 | 4/2014 | Takahashi et al. |
| 8,713,417 B2 | 4/2014 | Jo |
| 8,762,609 B1 | 6/2014 | Lam et al. |
| 8,788,725 B2 | 7/2014 | Bruce et al. |
| 8,832,371 B2 | 9/2014 | Uehara et al. |
| 8,856,392 B2 | 10/2014 | Myrah et al. |
| 8,959,307 B1 | 2/2015 | Bruce et al. |
| 9,043,669 B1 | 5/2015 | Bruce et al. |
| 9,099,187 B2 | 8/2015 | Bruce et al. |
| 9,135,190 B1 | 9/2015 | Bruce et al. |
| 9,147,500 B2 | 9/2015 | Kim et al. |
| 9,158,661 B2 | 10/2015 | Blaine et al. |
| 9,201,790 B2 | 12/2015 | Keeler |
| 9,400,617 B2 | 7/2016 | Ponce et al. |
| 2001/0010066 A1 | 7/2001 | Chin et al. |
| 2002/0011607 A1 | 1/2002 | Gelke et al. |
| 2002/0013880 A1 | 1/2002 | Gappisch et al. |
| 2002/0044486 A1 | 4/2002 | Chan et al. |
| 2002/0073324 A1 | 6/2002 | Hsu et al. |
| 2002/0083262 A1 | 6/2002 | Fukuzumi |
| 2002/0083264 A1 | 6/2002 | Coulson |
| 2002/0141244 A1 | 10/2002 | Bruce et al. |
| 2003/0023817 A1 | 1/2003 | Rowlands et al. |
| 2003/0065836 A1 | 4/2003 | Pecone |
| 2003/0097248 A1 | 5/2003 | Terashima et al. |
| 2003/0120864 A1 | 6/2003 | Lee et al. |
| 2003/0126451 A1 | 7/2003 | Gorobets |
| 2003/0131201 A1 | 7/2003 | Khare et al. |
| 2003/0161355 A1 | 8/2003 | Falcomato et al. |
| 2003/0163624 A1 | 8/2003 | Matsui et al. |
| 2003/0163647 A1 | 8/2003 | Cameron et al. |
| 2003/0163649 A1 | 8/2003 | Kapur et al. |
| 2003/0182576 A1 | 9/2003 | Morlang et al. |
| 2003/0188100 A1 | 10/2003 | Solomon et al. |
| 2003/0204675 A1 | 10/2003 | Dover et al. |
| 2003/0217202 A1 | 11/2003 | Zilberman et al. |
| 2003/0223585 A1 | 12/2003 | Tardo |
| 2004/0073721 A1 | 4/2004 | Goff et al. |
| 2004/0078632 A1 | 4/2004 | Infante et al. |
| 2004/0128553 A1 | 7/2004 | Buer et al. |
| 2004/0215868 A1 | 10/2004 | Solomon et al. |
| 2005/0050245 A1 | 3/2005 | Miller et al. |
| 2005/0055481 A1 | 3/2005 | Chou et al. |
| 2005/0078016 A1 | 4/2005 | Neff |
| 2005/0080952 A1 | 4/2005 | Oner et al. |
| 2005/0097368 A1 | 5/2005 | Peinado et al. |
| 2005/0120146 A1 | 6/2005 | Chen et al. |
| 2005/0210149 A1 | 9/2005 | Kimball |
| 2005/0210159 A1 | 9/2005 | Voorhees et al. |
| 2005/0226407 A1 | 10/2005 | Kasuya et al. |
| 2005/0240707 A1 | 10/2005 | Hayashi et al. |
| 2005/0243610 A1 | 11/2005 | Guha et al. |
| 2005/0289361 A1 | 12/2005 | Sutardja |
| 2006/0004957 A1 | 1/2006 | Hand, III et al. |
| 2006/0026329 A1 | 2/2006 | Yu |
| 2006/0031450 A1 | 2/2006 | Unrau et al. |
| 2006/0039406 A1 | 2/2006 | Day et al. |
| 2006/0064520 A1 | 3/2006 | Anand et al. |
| 2006/0095709 A1 | 5/2006 | Achiwa |
| 2006/0112251 A1 | 5/2006 | Karr et al. |
| 2006/0129876 A1 | 6/2006 | Uemura |
| 2006/0173970 A1* | 8/2006 | Pope ............... G06F 9/4812 709/216 |
| 2006/0184723 A1 | 8/2006 | Sinclair et al. |
| 2007/0019573 A1 | 1/2007 | Nishimura |
| 2007/0028040 A1 | 2/2007 | Sinclair |
| 2007/0058478 A1 | 3/2007 | Murayama |
| 2007/0073922 A1 | 3/2007 | Go et al. |
| 2007/0079017 A1 | 4/2007 | Brink et al. |
| 2007/0083680 A1 | 4/2007 | King et al. |
| 2007/0088864 A1 | 4/2007 | Foster |
| 2007/0093124 A1 | 4/2007 | Varney et al. |
| 2007/0094450 A1 | 4/2007 | VanderWiel |
| 2007/0096785 A1 | 5/2007 | Maeda |
| 2007/0121499 A1 | 5/2007 | Pal et al. |
| 2007/0130439 A1 | 6/2007 | Andersson et al. |
| 2007/0159885 A1 | 7/2007 | Gorobets |
| 2007/0168754 A1 | 7/2007 | Zohar et al. |
| 2007/0174493 A1 | 7/2007 | Irish et al. |
| 2007/0174506 A1 | 7/2007 | Tsuruta |
| 2007/0195957 A1 | 8/2007 | Arulambalam et al. |
| 2007/0288686 A1 | 12/2007 | Arcedera et al. |
| 2007/0288692 A1 | 12/2007 | Bruce et al. |
| 2007/0294572 A1 | 12/2007 | Kalwitz et al. |
| 2008/0005481 A1 | 1/2008 | Walker |
| 2008/0052456 A1 | 2/2008 | Ash et al. |
| 2008/0052585 A1 | 2/2008 | LaBerge et al. |
| 2008/0072031 A1 | 3/2008 | Choi |
| 2008/0104264 A1 | 5/2008 | Duerk et al. |
| 2008/0140724 A1 | 6/2008 | Flynn et al. |
| 2008/0147946 A1 | 6/2008 | Pesavento et al. |
| 2008/0147963 A1 | 6/2008 | Tsai et al. |
| 2008/0189466 A1 | 8/2008 | Hemmi |
| 2008/0195800 A1 | 8/2008 | Lee et al. |
| 2008/0218230 A1 | 9/2008 | Shim |
| 2008/0228959 A1 | 9/2008 | Wang |
| 2008/0276037 A1 | 11/2008 | Chang et al. |
| 2008/0301256 A1 | 12/2008 | McWilliams et al. |
| 2009/0028229 A1 | 1/2009 | Cagno et al. |
| 2009/0037565 A1 | 2/2009 | Andresen et al. |
| 2009/0055573 A1 | 2/2009 | Ito |
| 2009/0055713 A1 | 2/2009 | Hong et al. |
| 2009/0077306 A1 | 3/2009 | Arcedera et al. |
| 2009/0083022 A1 | 3/2009 | Bin Mohd Nordin et al. |
| 2009/0094411 A1 | 4/2009 | Que |
| 2009/0132620 A1 | 5/2009 | Arakawa |
| 2009/0132752 A1 | 5/2009 | Poo et al. |
| 2009/0150643 A1 | 6/2009 | Jones et al. |
| 2009/0158085 A1 | 6/2009 | Kern et al. |
| 2009/0172250 A1 | 7/2009 | Allen et al. |
| 2009/0172261 A1 | 7/2009 | Prins et al. |
| 2009/0172466 A1 | 7/2009 | Royer et al. |
| 2009/0240873 A1 | 9/2009 | Yu et al. |
| 2010/0058045 A1 | 3/2010 | Borras et al. |
| 2010/0095053 A1 | 4/2010 | Bruce et al. |
| 2010/0125695 A1 | 5/2010 | Wu et al. |
| 2010/0250806 A1 | 9/2010 | Devilla et al. |
| 2010/0268904 A1 | 10/2010 | Sheffield et al. |
| 2010/0299538 A1 | 11/2010 | Miller |
| 2010/0318706 A1 | 12/2010 | Kobayashi |
| 2011/0022778 A1 | 1/2011 | Schibilla et al. |
| 2011/0022783 A1 | 1/2011 | Moshayedi |
| 2011/0022801 A1 | 1/2011 | Flynn |
| 2011/0087833 A1 | 4/2011 | Jones |
| 2011/0093648 A1 | 4/2011 | Belluomini et al. |
| 2011/0113186 A1 | 5/2011 | Bruce et al. |
| 2011/0133826 A1 | 6/2011 | Jones et al. |
| 2011/0145479 A1 | 6/2011 | Talagala et al. |
| 2011/0161568 A1 | 6/2011 | Bruce et al. |
| 2011/0167204 A1 | 7/2011 | Estakhri et al. |

(56) References Cited

U.S. PATENT DOCUMENTS

| | | |
|---|---|---|
| 2011/0173383 A1 | 7/2011 | Gorobets |
| 2011/0197011 A1 | 8/2011 | Suzuki et al. |
| 2011/0202709 A1 | 8/2011 | Rychlik |
| 2011/0208901 A1 | 8/2011 | Kim et al. |
| 2011/0208914 A1 | 8/2011 | Winokur et al. |
| 2011/0219150 A1 | 9/2011 | Piccirillo et al. |
| 2011/0258405 A1 | 10/2011 | Asaki et al. |
| 2011/0264884 A1 | 10/2011 | Kim |
| 2011/0264949 A1 | 10/2011 | Ikeuchi et al. |
| 2011/0270979 A1 | 11/2011 | Schlansker et al. |
| 2012/0005405 A1 | 1/2012 | Wu et al. |
| 2012/0005410 A1 | 1/2012 | Ikeuchi |
| 2012/0017037 A1 | 1/2012 | Riddle et al. |
| 2012/0079352 A1 | 3/2012 | Frost et al. |
| 2012/0102263 A1 | 4/2012 | Aswadhati |
| 2012/0102268 A1 | 4/2012 | Smith et al. |
| 2012/0137050 A1 | 5/2012 | Wang et al. |
| 2012/0159029 A1 | 6/2012 | Krishnan et al. |
| 2012/0161568 A1 | 6/2012 | Umemoto et al. |
| 2012/0173795 A1 | 7/2012 | Schuette et al. |
| 2012/0215973 A1 | 8/2012 | Cagno et al. |
| 2012/0249302 A1 | 10/2012 | Szu |
| 2012/0260102 A1 | 10/2012 | Zaks et al. |
| 2012/0271967 A1 | 10/2012 | Hirschman |
| 2012/0303924 A1 | 11/2012 | Ross |
| 2012/0311197 A1 | 12/2012 | Larson et al. |
| 2012/0324277 A1 | 12/2012 | Weston-Lewis et al. |
| 2013/0010058 A1 | 1/2013 | Pmeroy |
| 2013/0019053 A1 | 1/2013 | Somanache et al. |
| 2013/0073821 A1 | 3/2013 | Flynn et al. |
| 2013/0094312 A1 | 4/2013 | Jang et al. |
| 2013/0099838 A1 | 4/2013 | Kim et al. |
| 2013/0111135 A1 | 5/2013 | Bell, Jr. et al. |
| 2013/0206837 A1 | 8/2013 | Szu |
| 2013/0208546 A1 | 8/2013 | Kim et al. |
| 2013/0212337 A1 | 8/2013 | Maruyama |
| 2013/0212349 A1 | 8/2013 | Maruyama |
| 2013/0212425 A1 | 8/2013 | Blaine et al. |
| 2013/0246694 A1 | 9/2013 | Bruce et al. |
| 2013/0254435 A1 | 9/2013 | Shapiro et al. |
| 2013/0262750 A1 | 10/2013 | Yamasaki et al. |
| 2013/0282933 A1 | 10/2013 | Jokinen et al. |
| 2013/0304775 A1 | 11/2013 | Davis et al. |
| 2013/0339578 A1 | 12/2013 | Ohya et al. |
| 2013/0339582 A1 | 12/2013 | Olbrich et al. |
| 2013/0346672 A1 | 12/2013 | Sengupta et al. |
| 2014/0047241 A1 | 2/2014 | Kato et al. |
| 2014/0068177 A1 | 3/2014 | Raghavan |
| 2014/0095803 A1 | 4/2014 | Kim et al. |
| 2014/0104949 A1 | 4/2014 | Bruce et al. |
| 2014/0108869 A1 | 4/2014 | Brewerton et al. |
| 2014/0189203 A1 | 7/2014 | Suzuki et al. |
| 2014/0258788 A1 | 9/2014 | Maruyama |
| 2014/0285211 A1 | 9/2014 | Raffinan |
| 2014/0331034 A1 | 11/2014 | Ponce et al. |
| 2015/0006766 A1 | 1/2015 | Ponce et al. |
| 2015/0012690 A1 | 1/2015 | Bruce et al. |
| 2015/0032937 A1 | 1/2015 | Salessi |
| 2015/0032938 A1 | 1/2015 | Salessi |
| 2015/0067243 A1 | 3/2015 | Salessi et al. |
| 2015/0149697 A1 | 5/2015 | Salessi et al. |
| 2015/0149706 A1 | 5/2015 | Salessi et al. |
| 2015/0153962 A1 | 6/2015 | Salessi et al. |
| 2015/0169021 A1 | 6/2015 | Salessi et al. |
| 2015/0261456 A1 | 9/2015 | Alcantara et al. |
| 2015/0261475 A1 | 9/2015 | Alcantara et al. |
| 2015/0261797 A1 | 9/2015 | Alcantara et al. |
| 2015/0370670 A1 | 12/2015 | Lu |
| 2015/0371684 A1 | 12/2015 | Mataya |
| 2015/0378932 A1 | 12/2015 | Souri et al. |
| 2016/0026402 A1 | 1/2016 | Alcantara et al. |
| 2016/0027521 A1 | 1/2016 | Lu |
| 2016/0041596 A1 | 2/2016 | Alcantara et al. |

FOREIGN PATENT DOCUMENTS

| | | |
|---|---|---|
| TW | 489308 | 6/2002 |
| TW | 200428219 A | 12/2004 |
| TW | 436689 | 12/2005 |
| TW | I420316 | 12/2013 |
| WO | WO 94/06210 | 3/1994 |
| WO | WO 98/38568 | 9/1998 |

OTHER PUBLICATIONS

Office Action dated Jul. 19, 2017 for U.S. Appl. No. 14/690,349.
Office Action dated Feb. 8, 2017 for U.S. Appl. No. 14/690,349.
Office Action dated Aug. 28, 2017 for U.S. Appl. No. 14/690,114.
Office Action dated Jul. 10, 2017 for U.S. Appl. No. 14/690,114.
Office Action dated Apr. 20, 2017 for U.S. Appl. No. 14/690,114.
Office Action dated Sep. 12, 2016 for U.S. Appl. No. 14/690,114.
Office Action dated Oct. 10, 2017 for U.S. Appl. No. 14/217,249.
Office Action dated Apr. 14, 2017 for U.S. Appl. No. 14/217,249.
Office Action for U.S. Appl. No. 13/475,878, dated Jun. 23, 2014.
Office Action for U.S. Appl. No. 13/253,912 dated Jul. 16, 2014.
Office Action for U.S. Appl. No. 12/876,113 dated Jul. 11, 2014.
Office Action for U.S. Appl. No. 12/270,626 dated Feb. 3, 2012.
Office Action for U.S. Appl. No. 12/270,626 dated Apr. 4, 2011.
Office Action for U.S. Appl. No. 12/270,626 dated Mar. 15, 2013.
Notice of Allowance/Allowability for U.S. Appl. No. 12/270,626 dated Oct. 3, 2014.
Advisory Action for U.S. Appl. No. 12/876,113 dated Oct. 16, 2014.
Office Action for U.S. Appl. No. 14/297,628 dated Jul. 17, 2015.
Office Action for U.S. Appl. No. 13/475,878 dated Dec. 4, 2014.
Uspto Notice of Allowability & attachment(s) dated Jan. 7, 2013 for U.S. Appl. No. 12/876,247.
Office Action dated Sep. 14, 2012 for U.S. Appl. No. 12/876,247.
Office Action dated Feb. 1, 2012 for U.S. Appl. No. 12/876,247.
Notice of Allowance/Allowability dated Mar. 31, 2015 for U.S. Appl. No. 13/475,878.
Office Action dated May 22, 2015 for U.S. Appl. No. 13/253,912.
Office Action for U.S. Appl. No. 12/876,113 dated Mar. 13, 2014.
Advisory Action for U.S. Appl. No. 12/876,113 dated Sep. 6, 2013.
Office Action for U.S. Appl. No. 12/876,113 dated May 14, 2013.
Office Action for U.S. Appl. No. 12/876,113 dated Dec. 21, 2012.
Security Comes to SNMP: The New SNMPv3 Proposed Internet Standard, The Internet Protocol Journal, vol. 1, No. 3, Dec. 1998.
Notice of Allowability for U.S. Appl. No. 12/882,059 dated May 30, 2013.
Notice of Allowability for U.S. Appl. No. 12/882,059 dated Feb. 14, 2013.
Office Action for U.S. Appl. No. 12/882,059 dated May 11, 2012.
Notice of Allowability for U.S. Appl. No. 14/038,684 dated Aug. 1, 2014.
Office Action for U.S. Appl. No. 14/038,684 dated Mar. 17, 2014.
Notice of Allowance/Allowability for U.S. Appl. No. 13/890,229 dated Feb. 20, 2014.
Office Action for U.S. Appl. No. 13/890,229 dated Oct. 8, 2013.
Office Action for U.S. Appl. No. 12/876,113 dated Dec. 5, 2014.
Notice of Allowance/Allowabilty for U.S. Appl. No. 12/876,113 dated Jun. 22, 2015.
Office Action for U.S. Appl. No. 14/217,249 dated Apr. 23, 2015.
Office Action for U.S. Appl. No. 14/217,467 dated Apr. 27, 2015.
Office Action for U.S. Appl. No. 14/616,700 dated Apr. 30, 2015.
Office Action for U.S. Appl. No. 14/217,436 dated Sep. 11, 2015.
Office Action for U.S. Appl. No. 13/475,878 dated Jun. 23, 2014.
Office Action for U.S. Appl. No. 12/876,113 dated Oct. 16, 2014.
Notice of Allowance for U.S. Appl. No. 12/270,626 dated Oct. 3, 2014.
Office Action for U.S. Appl. No. 12/270,626 dated May 23, 2014.
Office Action for U.S. Appl. No. 12/270,626 dated Dec. 18, 2013.
Office Action for U.S. Appl. No. 12/270,626 dated Aug. 23, 2012.
Office Action dated Sep. 11, 2015 for U.S. Appl. No. 14/217,436.
Office Action dated Sep. 24, 2015 for U.S. Appl. No. 14/217,334.
Office Action dated Sep. 18, 2015 for Taiwanese Patent Application No. 102144165.
Office Action dated Sep. 29, 2015 for U.S. Appl. No. 14/217,316.

(56) References Cited

OTHER PUBLICATIONS

Office Action dated Sep. 28, 2015 for U.S. Appl. No. 14/689,045.
Office Action dated Dec. 5, 2014 for U.S. Appl. No. 14/038,684.
Office Action dated Oct. 8, 2015 for U.S. Appl. No. 14/217,291.
Final Office Action dated Nov. 19, 2015 for U.S. Appl. No. 14/217,249.
Final Office Action dated Nov. 18, 2015 for U.S. Appl. No. 14/217,467.
Office Action dated Nov. 25 2015 for U.S. Appl. No. 14/217,041.
Office Action dated Oct. 5, 2015 for Taiwanese Application No. 103105076.
Office Action dated Nov. 19, 2015 for U.S. Appl. No. 14/217,249.
Office Action dated Nov. 18, 2015 for U.S. Appl. No. 14/217,467.
Office Action dated Dec. 4, 2015 for U.S. Appl. No. 14/616,700.
Office Action dated Jun. 4, 2015 for U.S. Appl. No. 14/215,414.
Office Action dated Dec. 15, 2015 for U.S. Appl. No. 13/253,912.
Office Action dated Dec. 17, 2015 for U.S. Appl. No. 14/214,216.
Office Action dated Dec. 17, 2015 for U.S. Appl. No. 14/215,414.
Office Action dated Dec. 17, 2015 for U.S. Appl. No. 14/803,107.
Office Action dated Jan. 15, 2016 for U.S. Appl. No. 14/866,946.
Office Action dated Jan. 11, 2016 for U.S. Appl. No. 14/217,399.
Office Action dated Jan. 15 ,2016 for U.S. Appl. No. 14/216,937.
Notice of Allowance and Examiner-Initiated Interview Summary, dated Jan. 29, 2016 for U.S. Appl. No. 14/297,628.
National Science Fountation,Award Abstract #1548968, SBIR Phase I: SSD In-Situ Processing, http://www.nsf.gov/awardsearch/showAward?AWD_ID=1548968 printed on Feb. 13, 2016.
Design-Reuse, NxGn Data Emerges from Stealth Mode to provide a paradigm shift in enterprise storage solution,. http://www.design-reuse.com/news/35111/nxgn-data-intelligent-solutions.html, printed on Feb. 13, 2016.
Office Action for U.S. Appl. No. 14/217,365 dated Feb. 18, 2016.
Office Action for U.S. Appl. No. 14/217,365 dated Mar. 2, 2016.
Office Action for U.S. Appl. No. 14/690,305 dated Feb. 25, 2016.
Office Action for U.S. Appl. No. 14/217,436 dated Feb. 25, 2016.
Office Action for U.S. Appl. No. 14/217,316 dated Feb. 26. 2016.
Office Action for U.S. Appl. No. 14/215,414 dated Mar. 1, 2016.
Office Action for U.S. Appl. No. 14/616,700 dated Mar. 8, 2016.
Notice of allowance/allowability for U.S. Appl. No. 13/253,912 dated Mar. 21, 2016.
Notice of allowance/allowability for U.S. Appl. No. 14/803,107 dated Mar. 28, 2016.
Office Action for U.S. Appl. No. 14/217,334 dated Apr. 4, 2016.
Notice of allowance/allowability for U.S. Appl. No. 14/217,041 dated Apr. 11, 2016.
Office Action for U.S. Appl. No. 14/217,249 dated Apr. 21, 2016.
Notice of allowance/allowability for U.S. Appl. No. 14/217,467 dated Apr. 20, 2016.
Notice of allowance/allowability for U.S. Appl. No. 14/214,216 dated Apr. 27, 2016.
Notice of allowance/allowability for U.S. Appl. No. 14/217,436 dated May 6, 2016.
Office Action for U.S. Appl. No. 14/215,414 dated May 20, 2016.
Office Action for U.S. Appl. No. 14/616,700 dated May 20, 2016.
Office Action for U.S. Appl. No. 14/689,019 dated May 20, 2016.
Advisory Action for U.S. Appl. No. 14/217,316 dated May 19, 2016.
Advisory Action for U.S. Appl. No. 14/217,334 dated Jun. 13, 2016.
Office Action for U.S. Appl. No. 14/217,291 dated Jun. 15, 2016.
Office Action for U.S. Appl. No. 14/217,096 dated Jul. 12, 2016.
Notice of Allowance for U.S. Appl. No. 14/217,399 dated Jul. 20, 2016. (Mailed in this current application).
Office Action for U.S. Appl. No. 14/866,946 dated Jul. 29, 2016.
Notice of Allowance for U.S. Appl. No. 14/217,334 dated Jul. 29, 2016.
Office Action for U.S. Appl. No. 14/690,243 dated Aug. 11, 2016.
Office Action for U.S. Appl. No. 14/690,370 dated Aug. 12, 2016.
Office Action for U.S. Appl. No. 14/216,937 dated Aug. 15, 2016.
Working Draft American National Standard Project T10/1601-D Information Technology Serial Attached SCSI—1.1 (SAS—1.1), Mar. 13, 2004 Revision 4.
Office Action for U.S. Appl. No. 14/217,316 dated Aug. 25, 2016.
Office Action for U.S. Appl. No. 14/690,305 dated Aug. 26, 2016.
Advisory Action for U.S. Appl. No. 14/217,291 dated Sep. 9, 2016.
Advisory Action for U.S. Appl. No. 14/689,045 dated Sep. 16, 2016.
Notice of Allowance for U.S. Appl. No. 14/182,303 dated Sep. 12, 2016
Advisory Action for U.S. Appl. No. 14/690,114 dated Sep. 12, 2016.
Notice of Allowance for U.S. Appl. No. 14/215,414 dated Sep. 23, 2016.
Advisory Action for U.S. Appl. No. 14/866,946 dated Oct. 13, 2016.
Office Action for U.S. Appl. No. 14/687,700 dated Sep. 26, 2016.
Office Action for U.S. Appl. No. 15/170,768 dated Oct. 6, 2016.
Notice of allowance/allowability for U.S. Appl. No. 14/217, 365 dated Oct. 18, 2016.
Office Action for U.S. Appl. No. 14/616,700 dated Oct. 20, 2016.
Office Action for U.S. Appl. No. 14/855,245 dated Oct. 26, 2016.
Office Action for U.S. Appl. No. 14/217,249 dated Oct. 28, 2016.
Office Action for U.S. Appl. No. 14/217,399 dated Nov. 1, 2016.
Office Action for U.S. Appl. No. 14/217,291 dated Nov. 3, 2016.
Office Action for U.S. Appl. No. 14/217,947 dated Nov. 4, 2016.
Office Action for U.S. Appl. No. 14/216,627 dated Nov. 7, 2016.
Office Action for U.S. Appl. No. 14/689,019 dated Nov. 18, 2016.
Office Action for U.S. Appl. No. 14/684,399 dated Nov. 21, 2016.
Notice of Allowance for U.S. Appl. No. 14/689,045 dated Nov. 21, 2016.
Notice of Allowance for U.S. Appl. No. 14/217,334 dated Nov. 23, 2016.
Advisory Action for U.S. Appl. No. 14/690,305 dated Nov. 25, 2016.
Notice of Allowance for U.S. Appl. No. 14/217,096 dated Dec. 5, 2016.
Notice of Allowance for U.S. Appl. No. 14/217,161 dated Dec. 30, 2016.
Office Action for U.S. Appl. No. 14/866,946 dated Jan. 5, 2017.
Office Action for U.S. Appl. No. 14/688,209 dated Jan. 11, 2017.
Amazon Route 53 Developer Guide API Version Jan. 4 2013, copyright 2017 by Amazon Web Services.
Host Bus Adapters (HBAs): What you need to know about networking workhorse by Alan Earls, Feb. 2003.
Office Action for U.S. Appl. No. 14/690,243 dated Jan. 13, 2017.
Office Action for U.S. Appl. No. 14/232,801 dated Jan. 19, 2017.
Notice of Allowance for U.S. Appl. No. 14/215,414 dated Jan. 20, 2017.
Advisory Action for U.S. Appl. No. 14/217,249 dated Jan. 26, 2017.
Notice of Allowance for U.S. Appl. No. 14/687,700 dated Jan. 27, 2016.
Office Action for U.S. Appl. No. 14/690,339 dated Feb. 3, 2017.
Office Action for U.S. Appl. No. 14/616,700 dated Feb. 9, 2017.
Notice of Allowance for U.S. Appl. No. 14/217,365 dated Feb. 10, 2017.
Office Action for U.S. Appl. No. 14/690,305 dated Feb. 10, 2017.
Office Action for U.S. Appl. No. 14/690,349 dated Feb. 8, 2017.
Advisory Action for U.S. Appl. No. 14/689,019 dated Feb. 17, 2017.
Office Action for U.S. Appl. No. 14/690,349 dated Feb. 27, 2017.
Robert Cooksey et al., A Stateless, Content-Directed Data Prefetching Mechanism, Copyright 2002 ACM.
Office Action for U.S. Appl. No. 14/866,946 dated Jul. 27 2017.
Office Action for U.S. Appl. No. 14/616,700 dated Jun. 2, 2017.
Office Action for U.S. Appl. No. 15/268,533 dated Jun. 2, 2017 (issued by Examiner in this application).
Office Action for U.S. Appl. No. 15/268,536 dated Apr. 27, 2017.
Office Action for U.S. Appl. No. 15/368,598 dated May 19, 2017.

\* cited by examiner

Fetching Process

Execution Process

SYSTEMATIC METHOD ON QUEUING OF DESCRIPTORS FOR MULTIPLE FLASH INTELLIGENT DMA ENGINE OPERATION

CROSS-REFERENCE(S) TO RELATED APPLICATIONS

This application claims the benefit of and priority to U.S. Provisional Application 61/980,640, filed 17 Apr. 2014. This U.S. Provisional Application 61/980,640 is hereby fully incorporated herein by reference.

FIELD

Embodiments of the invention relate generally to the acquisition of data wherein a usage of descriptors is formulated to handle the operations of Direct Memory Access (DMA) Engines in a system and/or in a network.

DESCRIPTION OF RELATED ART

The background description provided herein is for the purpose of generally presenting the context of the disclosure of the invention. Work of the presently named inventors, to the extent the work is described in this background section, as well as aspects of the description that may not otherwise qualify as prior art at the time of filing, are neither expressly nor impliedly admitted as prior art against this present disclosure of the invention.

In some conventional systems, a descriptor management system is formulated to store the descriptors in a shared memory and accessed by a single processor or by multiple processors. A single sequencer or a descriptor management unit is used to fetch the descriptors from the shared memory to the processor. Examples of descriptor management systems are disclosed, for example, in U.S. Pat. No. 6,963,946 which discloses descriptor management systems and methods for transferring data between a host and a peripheral, and in U.S. Patent Application Publication No. 2005/0080952 which discloses descriptor-based load-balancing systems.

However, these types of descriptor management systems are only able to optimize the usage of a single sequencer unit to work with the fetching of the descriptors from memory to the host processor and host 10 (input/output interface). The lone sequencer unit will become a bottleneck to the optimization of the operation of the host processor(s).

SUMMARY

One or more embodiments of the invention relates to the acquisition of data wherein a method of usage of descriptors is formulated to handle the operation of Direct Memory Access (DMA) Engines in a system and/or in a network. An embodiment of the invention is able to optimize the usage and communication between a plurality of Flash DMA engines which, in turn, minimizes the load of processor operation for multiple accesses to a peripheral device and/or memory and overcomes the issue on processor transactions versus time. Multiple accesses are also described, for example, in commonly-owned and commonly-assigned U.S. patent application Ser. No. 14/217,249 which is entitled SCATTER-GATHER APPROACH FOR PARALLEL DATA TRANSFER IN A MASS STORAGE SYSTEM and in commonly-owned and commonly-assigned U.S. Patent Application No. 61/980,628 which is entitled SCATTER-GATHER APPROACH FOR PARALLEL DATA TRANSFER IN A MASS STORAGE SYSTEM.

In an embodiment of the invention, the multiple DMA engines paved a way to a new concept of using a descriptor pipeline system flow and inter-descriptor concurrent transactions from the memory to the DMA engines. Each of the DMA Engines has its own respective slot in the shared memory and has its own respective fetching module. This aforementioned memory slot is filled up with a number of descriptors hierarchically organized into groups. These descriptors can also be systematically fetched, linked, queued, and/or even aborted on-the-fly by both its corresponding fetching module and/or its corresponding DMA engine.

According to an embodiment of the invention, in cases of concurrent operations, interlinking information between descriptor groups within a single engine and across other descriptor groups of another DMA engine is provided. Such feature also provides a flow control in the concurrency of the operations and interaction between DMA engines.

Flash Intelligent DMA engines are activated via descriptors that determine the operation(s) of the flash intelligent DMA engines. These descriptors are organized in a hierarchical manner according to the usage of the descriptor(s) in a specific operation. A series of descriptors words are bundled together to form a single descriptor queue and each descriptor queue are linked together to form a descriptor queue group.

One embodiment of the invention includes flash Intelligent DMA engines. In general, a descriptor is simply a command. Hence, an embodiment of this invention also applies to other kinds of cores as long as said cores receive commands, and not limited to just DMA engines (e.g., core=CPU, software modules, etc.).

In an embodiment of the invention, the descriptors are loaded into the DMA engine in two ways: (1) direct loading of the descriptors into the DMA engine via memory writes from a processor core, and/or (2) DMA engine pre-fetching of the descriptors. Pre-fetch performed by a DMA engine is done in two ways: (1) Fixed Addressing—The normal priority descriptor groups can be written in a fixed position in memory where the DMA engine can continuously pre-fetch (via DMA reads) the succeeding descriptors; and/or (2) Linked List Addressing—The descriptor has a linked list structure that allows continuous pre-fetch of succeeding descriptors across different positions in memory. In an embodiment of the invention, the descriptor also employs tagging that allows monitoring which descriptor is pending, in-service, and done (wherein a descriptor has the status of done when a DMA engine has already executed the descriptor and performed the DMA operation by executing the descriptor).

These descriptors can be set up and updated continuously on the fly by adding into the linked list or the fixed memory descriptor locations. Descriptors are then loaded and executed by the DMA engine with minimal processor intervention.

In an embodiment of the invention, the high priority descriptor can be set up using a fixed addressing method. When present, the high priority descriptor can sneak in during execution of the normal priority descriptors.

In an embodiment of the invention, a method comprises: fetching a first set of descriptors from a memory device and writing the first set of descriptors to a buffer; retrieving the first set of descriptors from the buffer and processing the first set of descriptors to permit a Direct Memory Access (DMA) operation; and if space is available in the buffer, fetching a second set of descriptors from the memory device and writing the second set of descriptors to the buffer during or after the processing of the first set of descriptors.

In another embodiment of the invention, an apparatus comprises: a fetching module configured to fetch a first set of descriptors from a memory device and to write the first set of descriptors to a buffer; a sequencer configured to retrieve the first set of descriptors from the buffer and to process the first set of descriptors to permit a Direct Memory Access (DMA) operation; and wherein if space is available in the buffer, the fetching module is configured to fetch a second set of descriptors from the memory device and to write the second set of descriptors to the buffer during or after the processing of the first set of descriptors.

In yet another embodiment of the invention, an article of manufacture, comprises: a non-transient computer-readable medium having stored thereon instructions that permit a method comprising: fetching a first set of descriptors from a memory device and writing the first set of descriptors to a buffer; retrieving the first set of descriptors from the buffer and processing the first set of descriptors to permit a Direct Memory Access (DMA) operation; and if space is available in the buffer, fetching a second set of descriptors from the memory device and writing the second set of descriptors to the buffer during or after the processing of the first set of descriptors.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

BRIEF DESCRIPTION OF DRAWINGS

Non-limiting and non-exhaustive embodiments of the present invention are described with reference to the following figures, wherein like reference numerals refer to like parts throughout the various views unless otherwise specified.

It is to be noted, however, that the appended drawings illustrate only typical embodiments of this invention and are therefore not to be considered limiting of its scope, for the present invention may admit to other equally effective embodiments.

DETAILED DESCRIPTION

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual implementation, numerous implementation-specific decisions may be required to achieve specific design objectives. These design objectives will vary from one implementation to another and from one developer to another. Moreover, it will be appreciated that such a development effort might be complex and time-consuming, but would nevertheless be a routine engineering undertaking for those of ordinary skill in the art having the benefit of this disclosure. The various embodiments disclosed herein are not intended to limit the scope and spirit of the herein disclosure.

Exemplary embodiments for carrying out the principles of the present invention are described herein with reference to the drawings. However, the present invention is not limited to the specifically described and illustrated embodiments. A person skilled in the art will appreciate that many other embodiments are possible without deviating from the basic concept of the invention. Therefore, the principles of the present invention extend to any work that falls within the scope of the appended claims.

As used herein, the terms "a" and "an" herein do not denote a limitation of quantity, but rather denote the presence of at least one of the referenced items.

An embodiment of the invention relates to the acquisition of data wherein a method of usage of descriptors is formulated to handle the operation of Direct Memory Access (DMA) Engines in a system and/or in a network. An embodiment of the invention can optimize the usage and communication between a plurality of Flash DMA engines which, in turn, minimizes the load of processor operation for multiple accesses to a peripheral and/or memory and overcomes the issue on processor transactions versus time.

Figure 1:
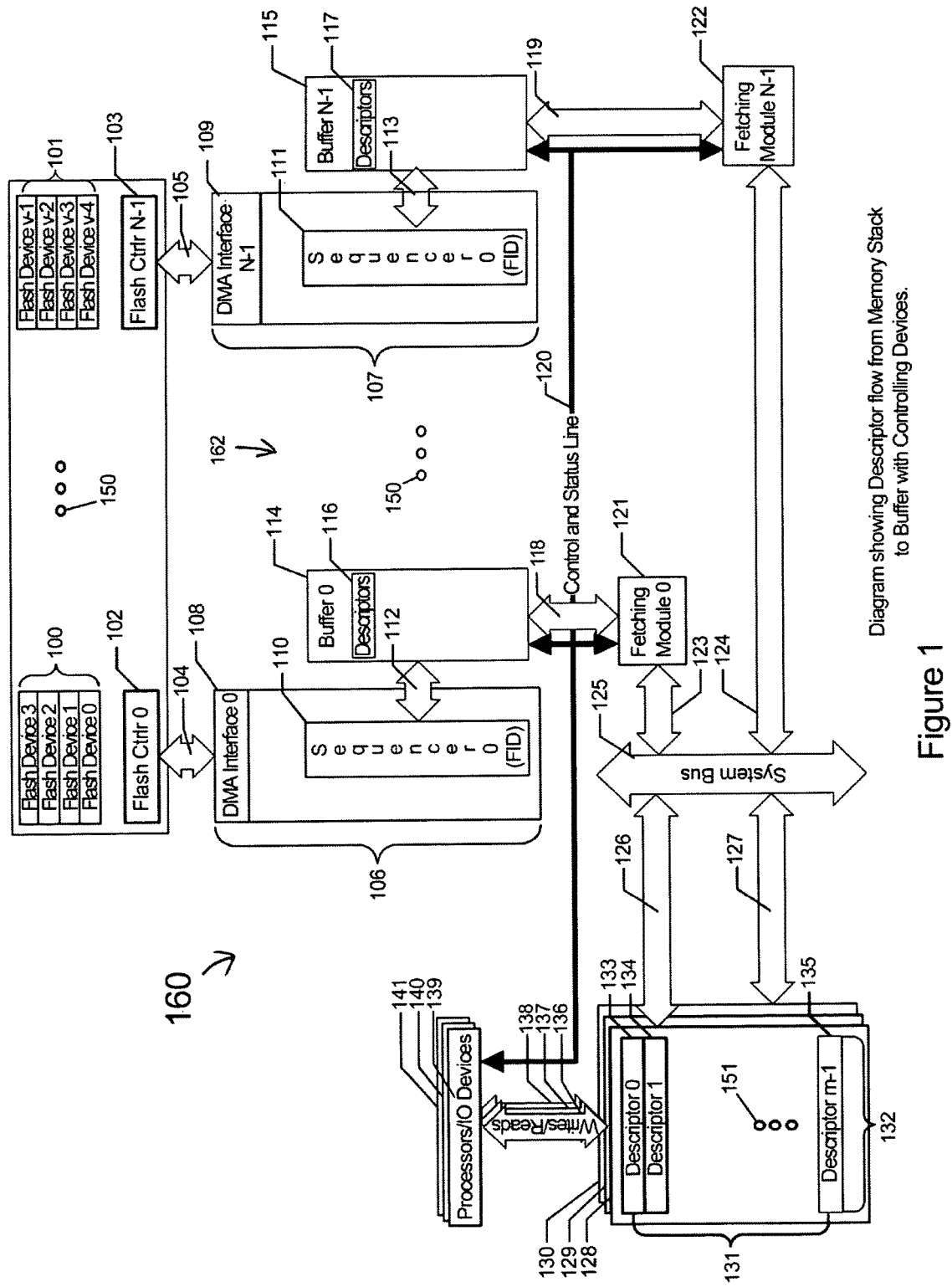
FIG. 1 is a block diagram illustrating a data storage system comprising a descriptor queuing system (descriptor queuing apparatus) including components used in a Direct Memory Access (DMA) Engine operation according to an embodiment of the invention.

FIG. 1 is a block diagram illustrating a data storage system 160 comprising a descriptor queuing system 162 (descriptor queuing apparatus 162) according to an embodiment of the invention. The system 162 (apparatus 162) comprises components used in a Direct Memory Access (DMA) Engine operation according to an embodiment of the invention.

In order to maximize the usage of the flash devices, a plurality of DMA engines 106~107 (i.e., DMA engines 106 through 107) are installed. Given the N number of DMA engines (wherein N is an integer), a systematic queuing method of command descriptors is formulated to control the operation of these DMA engines. The DMA engines (and corresponding flash controllers and flash device arrays) can each vary in number as in noted by, for example, the dot symbols 150. In other embodiments, the number of fetching modules is not necessarily equal to the number of DMA engines. Sometimes multiple DMA engines share a single fetching module. Sometimes, a single DMA engine can have multiple fetching modules, wherein each fetching module fetches a different set/linklist/group of descriptors.

In one embodiment of the invention, the system 160 comprises seven (7) major components which are shown as: (a) V number of Flash Device Arrays 100~101 arranged to allow progressive expansion of the flash devices in an array manner, wherein V is an integer and, by way of example and not by way of limitation, the flash device array 100 comprises flash devices 1~4 (i.e., flash devices 1, 2, 3, and 4) and flash device array 101 comprises flash devices V-4, V-3, V-2, and V-1; (b) Y number of Flash Controllers 102~103, with each flash controller controlling its own respective array of Flash Devices; (c) A plurality of processors 139~141 (processors 139, 140, and 141) responsible for the creation of the descriptors; (d) Several Memory Banks 128, 129, and 130 where the descriptors 133~135 (descriptors 133, 134, and 135) are written by a plurality of processors; (e) a plurality of buffers from buffer [0] 114 to buffer [N−1] 115 which temporarily stores the descriptors 116~117, wherein each of the descriptors corresponds to one DMA engine 106 via DMA-Buffer Bus [0] 112 or to another DMA engine 107 via DMA-Buffer Bus [N−1] 113; (f) a plurality of Fetching modules from Fetching Module [0] 121 to Fetching Module [N−1] 122, equal to the number of DMA engines, are responsible for the optimized transfer of the Descriptor Queues 133, 134, and 135 from the Memory banks 128, 129, and 130, respectively, to the Buffers 114~115 via a System Bus 125 of a different protocol; and (g) a plurality of DMA Engines 106~107 responsible for the organization of the Descriptor Queue Groups 116~117 and execution of these descriptor queue groups 116 and 117.

The number of DMA engines corresponds to the optimization of the usage of a Flashbus protocol or other bus IO standard protocol (e.g., PCIe) 104~105 and the plurality of Flash device controllers 102~103 that handles stacks of flash devices in the flash device arrays 100~101.

The descriptors 133, 134, and 135 are created by a plurality of processors and written by the processors into the memory banks 128, 129, and 130, respectively. The descriptors may vary in number as noted by, for example, the dot symbols 151. These memory banks 128, 129, and 130 can be an SDRAM or an SRAM or any other device of similar architecture. A single Memory bank piles up an M number of words 131 (where M is an integer) and each word is equal to an N-byte sized Descriptor Queue 132. On the other side of the memory banks, Fetching modules 121~122 are installed and can initially transfer these descriptors 133~135 from any of the memory banks 128, 129, and 130 to the Buffers 114~115 via the System Bus 125. For example, the fetching module 121 transfers the descriptors from memory bank 128 via bus interface 126 and system bus 125 and bus interface 123 and to the buffer 114 via bus 118. The fetching module 122 transfers the descriptors from memory bank 130 via bus interface 127 and system bus 125 and bus interface 124 and to the buffer 115 via bus 119. Another fetching module (not shown in FIG. 1) similarly transfers the descriptors from memory bank 129 via bus interfaces and system bus 125 to a buffer (not shown) between the buffers 114 and 115.

For a faster and direct accessibility of the descriptors to be used by a plurality of DMA engines, a buffer is installed per DMA engine. The command descriptors 133, 134, and 135 scattered in the memory bank are initially transferred by the fetching modules 121~122 to its respective buffers 114~115 where these descriptors could later be retrieved by the DMA Engine that owns the respective buffer. In the example of FIG. 1, the DMA engines 106 and 107 owns the buffers 114 and 115, respectively.

These descriptors, once accessed and read by the DMA engine, undergo certain stages of dissection before the descriptors can fully be used in controlling the DMA engines. The sequencers 110~111 (descriptor management units 110~111) are found internally in each of the DMA engines 106~107, respectively, and the DMA engines ensure that these descriptors are properly organized before the descriptors are executed. The DMA engines then translate the descriptors to several Flash operations by the DMA Interfaces 108~109 and received by the Flash Controllers 102~103 via the Flash Buses 104~105. These Flash Controllers 102~103 then directly manages the activation of the Flash Devices in the flash device arrays 100~101 and performs monitoring of the operations of the respective flash array that is managed by the corresponding flash controller.

As shown in the illustration in FIG. 1, a control and status line 120 is connected to the processors 139, 140, and 141, fetching modules 121~122, buffers 114~115, and DMA Engines 106~107. These lines 120 are used in order for the fetching modules 121~122 to communicate, monitor, and perform message passing to each other.

It is also noted that the processors 139, 140, and 141 perform memory transactions (e.g., writes and reads) 136, 137, and 138, respectively, on any of the memory banks 128, 129, and 130.

Figure 2:
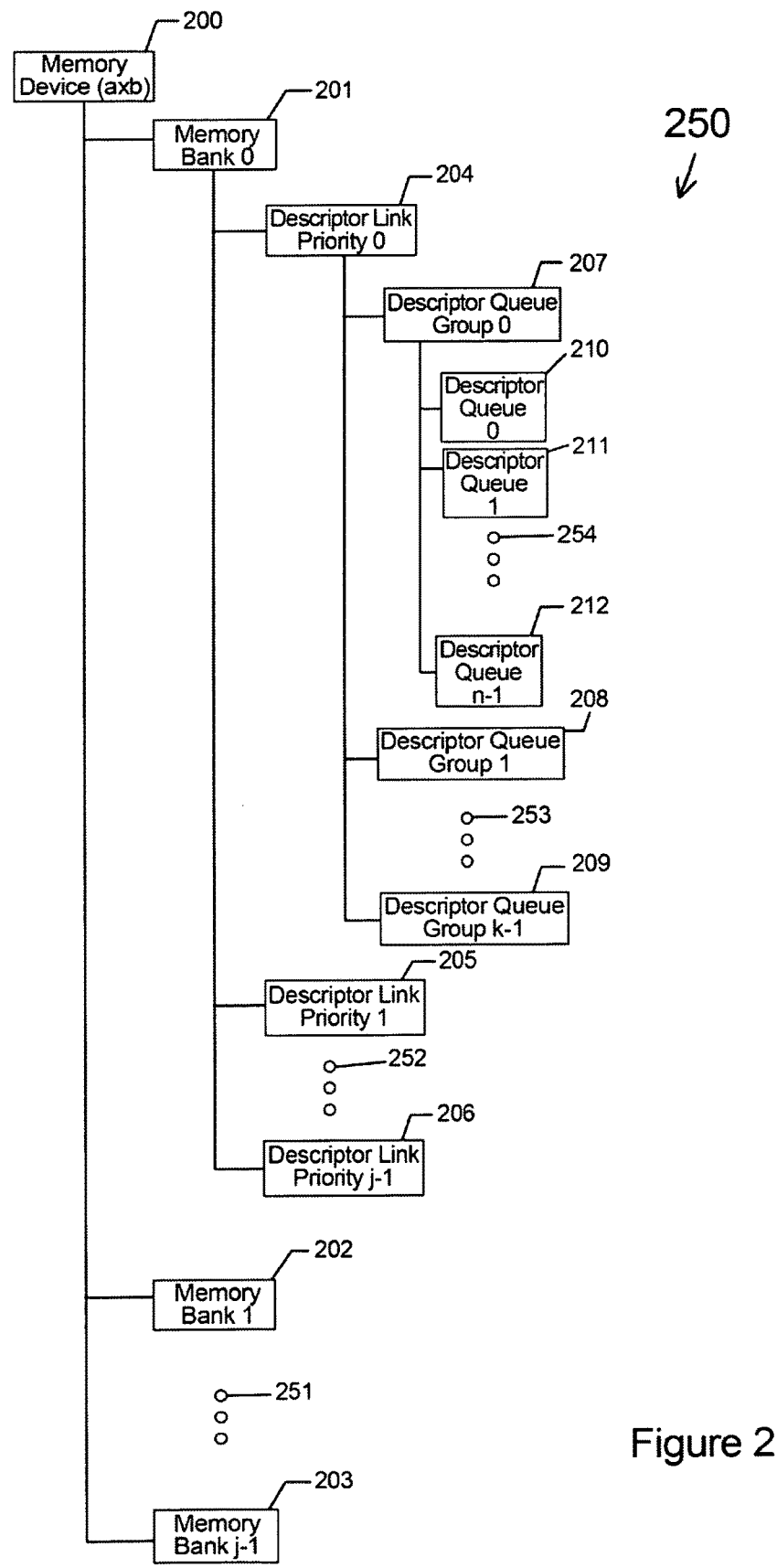
FIG. 2 is a chart diagram representation of an organization of the descriptors in a memory device according to an embodiment of the invention.

FIG. 2 is a chart diagram illustrating a hierarchical representation 250 of the Descriptors (or organization 250 of the descriptors) in a Memory Device 200 with multiple Memory Banks 201, 202, and 203, according to an embodiment of the invention. The memory banks in a memory device can vary in number as noted by, for example, the dot symbols 251.

Each memory bank comprises a plurality of Descriptor Links arranged from the highest priority to be fetched and serviced to the lower priorities for fetching and servicing. As illustrated in the example of FIG. 2, the memory bank [0] 201 comprises Descriptor Link 204 with priority [0], Descriptor Link 205 with priority [1], and up to Descriptor Link 206 with priority [j−1] 206, wherein j is an integer and wherein the order of the highest priority to lowest priority is priority [0], priority [1], and priority [j−1]. The descriptor links in a memory bank can vary in number as noted by, for example, the dot symbols 252.

Each Descriptor Link comprises a plurality of Descriptor Queue Groups (DQGs). For example, descriptor link 204 comprises Descriptor Queue Group [0] 207, Descriptor Queue Group [1] 208, and up to Descriptor Queue Group [k−1] 209, wherein k is an integer. The descriptor queue groups in a descriptor link can vary in number as noted by, for example, the dot symbols 253.

Each Descriptor Queue Group comprises an n number of Descriptor Queues (DQs), wherein n is an integer. For example, Descriptor Queue Group [0] 207 comprises Descriptor Queue [0] 210, Descriptor Queue [1] 211, and up to Descriptor Queue [n−1] 212. The descriptor queues in a descriptor queue group can vary in number as noted by, for example, the dot symbols 254. A single Descriptor Queue Group mainly handles one DMA operation with its Descriptor Queues describing the details required to complete the DMA operation of a DMA engine.

Figure 3:
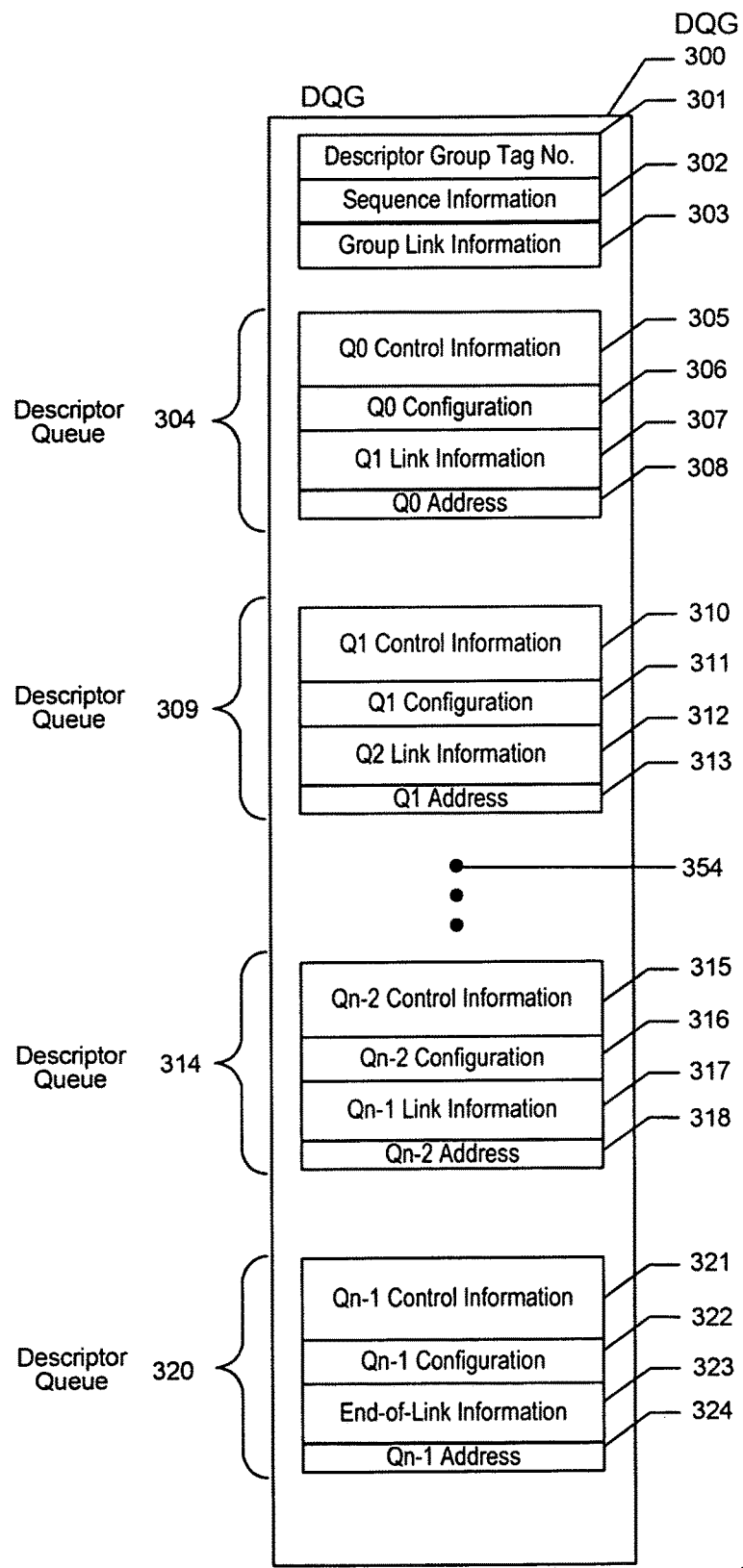
FIG. 3 is a block diagram illustrating a structure of a single descriptor queue Group (DQG) and the basic partitions of a single unit of a DMA Descriptor Queue (DQ) which handles the operation of a DMA engine according to an embodiment of the invention.

FIG. 3 is a block diagram illustrating a structure of a single descriptor queue Group (DQG) 300 and the basic partitions of a single unit of a DMA Descriptor Queue (DQ) which handles the operation of a DMA engine according to an embodiment of the invention. Examples of DQGs are also shown in FIG. 2 as DQGs 207, 208, and 209.

In the example of FIG. 3, the DQG 300 comprises an n number of Descriptor Queues 304, 309, . . . , 314, and 320. The descriptor queues in a descriptor queue group can vary in number as noted by, for example, the dot symbols 354. Therefore, there can be additional descriptor queues (not shown) between the descriptor queues 309 and 314, or the number of descriptor queues in DQG 300 can be less than four descriptor queues.

A DQG 300 contains a Descriptor Group Tag Number 301 used for as a reference in tracing the Descriptor Queue Group. This is also useful in abort and/or suspend or recovery stages of the Descriptor Queue Group monitored by the processor. A DQG 300 also contains the sequence information 302 which includes the Fetching priority number and the DMA engine service priority number which is used by the DMA engine to trace and re-arrange the service priority sequence of this descriptor queue group along with other descriptor queue groups in a Descriptor Link. This sequence information 302 can be dynamically changed by the processor in the buffer or other buffer memory components while the sequence information 302 is still queuing for the DMA engine. The Group Link Information 303 basically describes how the current descriptor queue Group is linked to the next DQG as well as providing information for monitoring the status of the preceding DQG. The Group Link Information 303 can also be used to determine whether the DQG 300 is linked to another DQG of the same descriptor Queue Link (e.g., descriptor link 204) or a different descriptor Queue Link within a single DMA engine or across a plurality of DMA engines. Descriptor queue links are also shown in FIG. 2 as example descriptor link 204 (with a first priority [0]), descriptor link 205 (with a second priority [1]), and up to descriptor link 206 (with another priority [j−1]). Other descriptor queue link information includes the atomic linking (see FIG. 8) wherein an injection of a high priority descriptor Queue Group(s) could not break the chain of Descriptor Queue Groups but rather waits for the whole descriptor queue link to be processed and stops the processing of the next set of linked descriptors.

Each Descriptor Queue 304, 309, . . . , 314, and 320 contains the four basic information: (1) Descriptor Address 308, 313, . . . , 318, 324, respectively, which are each the Memory bank address or the Buffer Address depending on where the descriptor is initially written; (2) Link information 307, 312, . . . , 317, 323, respectively, which contain the address of the next Descriptor that the descriptor is linked to as well as the preceding descriptor information and next Descriptor information and which DMA engine that will process the descriptor; (3) The Control Information 305, 310, . . . , 315, 321, respectively, which manipulate the basic operations of the DMA Engine, and (4) the configuration of the descriptor 306, 311, . . . , 316, 322, respectively, which determine whether the descriptor is used as a command or status descriptor as well as whether the descriptor is dynamically altered by software or hardware and whether the descriptor queue is aborted or suspended on-the-fly by the processor or the DMA engine itself.

Figure 4:
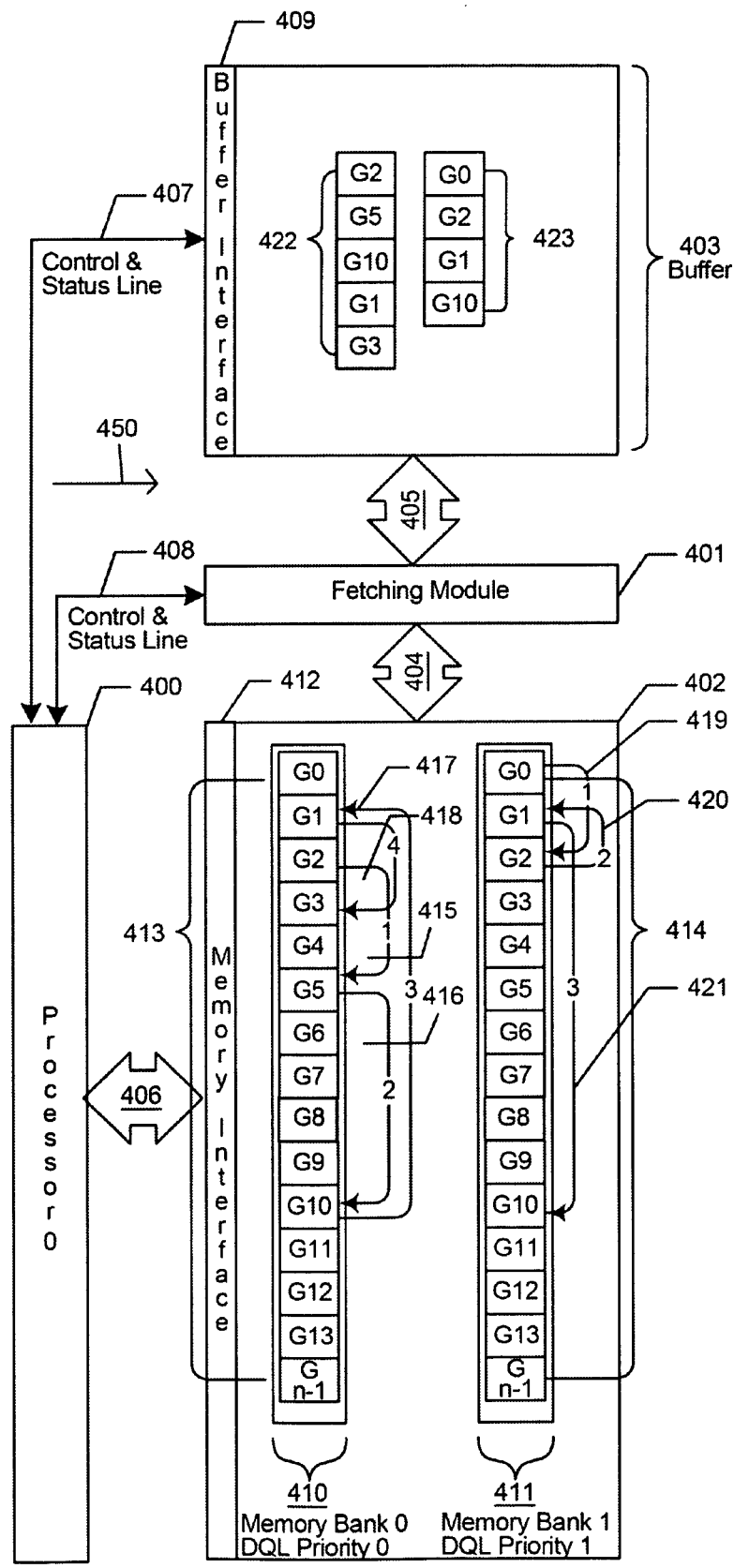
FIG. 4 is a block diagram illustrating a method of continuous transfer of DQGs from the memory stack to the buffer using a pre-fetching module according to an embodiment of the invention.

FIG. 4 is a block diagram illustrating a method of continuous transfer of DQGs from the memory stack to the buffer using a pre-fetching module (fetching module 401) according to an embodiment of the invention. This block diagram shows exemplary illustrations of the descriptor link structure during a single DMA descriptor pre-fetching from the Memory Device to the DMA Buffer. To show the method in a simplified manner, FIG. 4 illustrates a sample setup comprising the following components, wherein at least some of the following components are also similarly illustrated in FIG. 1: (a) a processor 400; (b) a memory device 402; (c) a couple of memory banks 410~411; (d) a single fetching module 401; (e) a buffer interface 409; (f) a singular buffer 403; and (g) multiple descriptor queue groups (DQGs) 413~414. The processor 400 initially writes the details of each of the descriptors in a Memory Bank 410~411 with different fetching priorities via the bus 406 and via the Memory Interface 412. The Control and Status lines 407~408 are used as communication lines between the processor 400 and the Buffer interface 409 and the Fetching module 401. For example, the processor 409 transmits a processor fetch signal 450 via control and status line 408 to inform the fetching module 401 about the next set of descriptors to be fetched by the fetching module 401 from the memory banks of memory device 402. Given the information in each of the DQG 413~414, as previously discussed above with reference to FIG. 3, the fetching module 401 continuously snoops at the Descriptor Queue Group Sequence information 302 and then performs the transfer process referring to the aforementioned information 302. A single fetching module 401 can concurrently or sequentially perform the transfer from different memory banks 410 and 411 via the Memory Busses 404 and 405 to the buffer 403. The Fetching movement relies on the Link Information forming sets of Descriptor Links; in FIG. 4, Memory bank 0 410 has a $1^{st}$ priority Descriptor Queue Links 415, 416, 417, and 418 (DQL Priority 0) and Memory Bank 1 411 has a $2^{nd}$ priority Descriptor Links 419, 420, and 421 (DQL Priority 1). The final stage of the fetching process is when the Descriptor Links (e.g., links 415~418 and 419~421) are successfully copied as links 422 and 423 in the buffer 403. Note that this process is not limited to the simplified setup and therefore can be replicated independently for multiple DMA engines as similarly discussed below with reference to FIG. 8.

In the example of FIG. 4, the descriptor link 415 comprises the connection _from_ descriptor queue group G2 _to_ G5 in memory bank 410.

The descriptor link 416 comprises the connection _from_ descriptor queue group G5 _to_ G10 in memory bank 410.

The descriptor link 417 comprises the connection _from_ descriptor queue group G10 _to_ G1 in memory bank 410.

The descriptor link 418 comprises the connection _from_ descriptor queue group G1 _to_ G3 in memory bank 410.

The descriptor link 416 comprises the descriptor queue groups G5, G6, G7, G8, G9, and G10 in memory bank 410.

The descriptor link 417 comprises the descriptor queue groups G1, G2, G3, G4, G5, G6, G7, G8, G9, and G10 in memory bank 410.

The descriptor link 418 comprises the descriptor queue groups G1, G2, and G3 in memory bank 410.

The descriptor link 419 comprises the connection _from_ descriptor queue group G0 _to_ G2 in memory bank 411.

The descriptor link 420 comprises the connection _from_ descriptor queue group G2 _to_ G1 in memory bank 411.

The descriptor link 421 comprises the connection _from_ descriptor queue group G1 _to_ G10 in memory bank 411.

Figure 5:
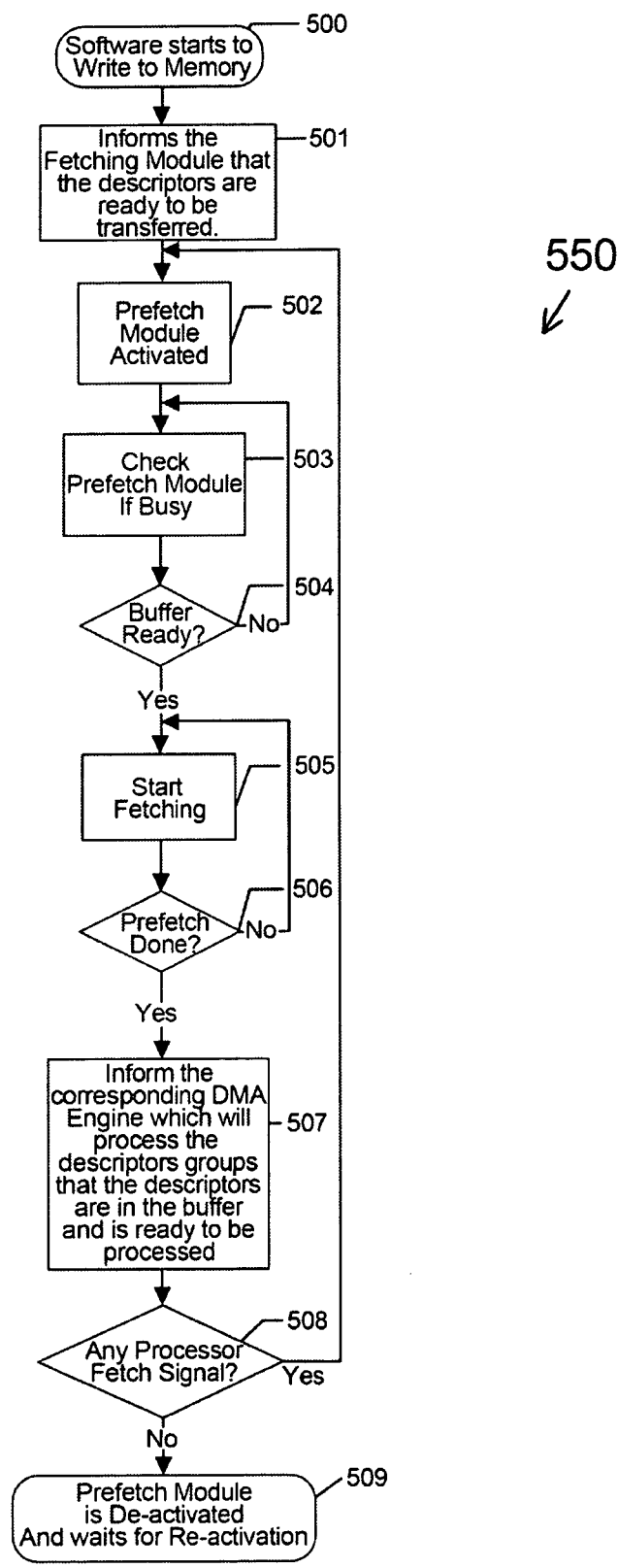
FIG. 5 is a flow chart diagram of an algorithm on the continuous pre-fetching process of the DQGs according to an embodiment of the invention.

FIG. 5 is a flow chart diagram of an algorithm 550 on the continuous pre-fetching process of the DQGs according to an embodiment of the invention. This fetching process 550 is performed by a Pre-fetching module (e.g., pre-fetching modules 121 or 401).

Reference is now made to FIGS. 4 and 5. At 500, the software represented (or executed) by processors 400 or any IO (input/output) device initially starts to write the descriptors queues to the memory device 402. At 501, the software informs and sends a processor fetch signal to the Fetching module 401 that enough descriptors are written in memory and are ready to be fetched and to be transferred.

At 502, the processor fetch signal 450 sent via the control lines 408 will immediately activate the fetching module 401.

At 504, the fetching module 401 then evaluates if there is space in the buffer 403 so that the buffer 403 is ready to receive descriptors. If the buffer 403 is full, the fetching module 401 will remain in busy mode at 503. At 504, if the buffer 403 has space, then at 505, the fetching module starts Fetching a first set of descriptors in Descriptor Links (e.g., links 415~418 and/or links 419~421).

At 506, when the fetching module 401 sees or detects an End-Of-Link information (e.g., end-of-link information 323 in FIG. 3), then the fetching module 401 assumes that the Group fetched (fetching of DQG 413 or DQG 414) is complete. At 506, if the Group fetched is not complete, then at 505, the fetching module 401 continues to fetch the descriptor links.

At 507, the fetching module 401 finishes the writes in the buffer 403 and informs the DMA engine (which owns or is associated with the buffer 403 and which will process the descriptor groups 413 and 414) that the descriptors are in the buffer 403 are ready to be safely retrieved and processed by the DMA engine (e.g., DMA engine 106 in FIG. 1) so that the descriptors permit the DMA engine to perform a DMA operation.

At 508, the fetching module 401 checks if the fetching module 401 sees (detects) a next set of descriptors to be fetched by fetching module 401 from the memory device 402. If there are no descriptors to be fetched, then at 509, the fetching module 401 is de-activated and waits for re-activation via processor fetch signal 450. At 508, if there is a next set of descriptors to be fetched, then the fetching module 502 is activated at 502 as similarly discussed above and the subsequent operations in method 550 are performed again as similarly discussed above. While the DMA engine is retrieving the above-mentioned first set of descriptors from the buffer 403 and is executing the first set of descriptors, at 505, the fetching module 401 starts to fetch a second set of descriptors from the memory device 402 and writes the second set of descriptors into the buffer 403 if the fetching module 401 determines at 504 that the buffer 403 has space for receiving the second set of descriptors.

Figure 6A:
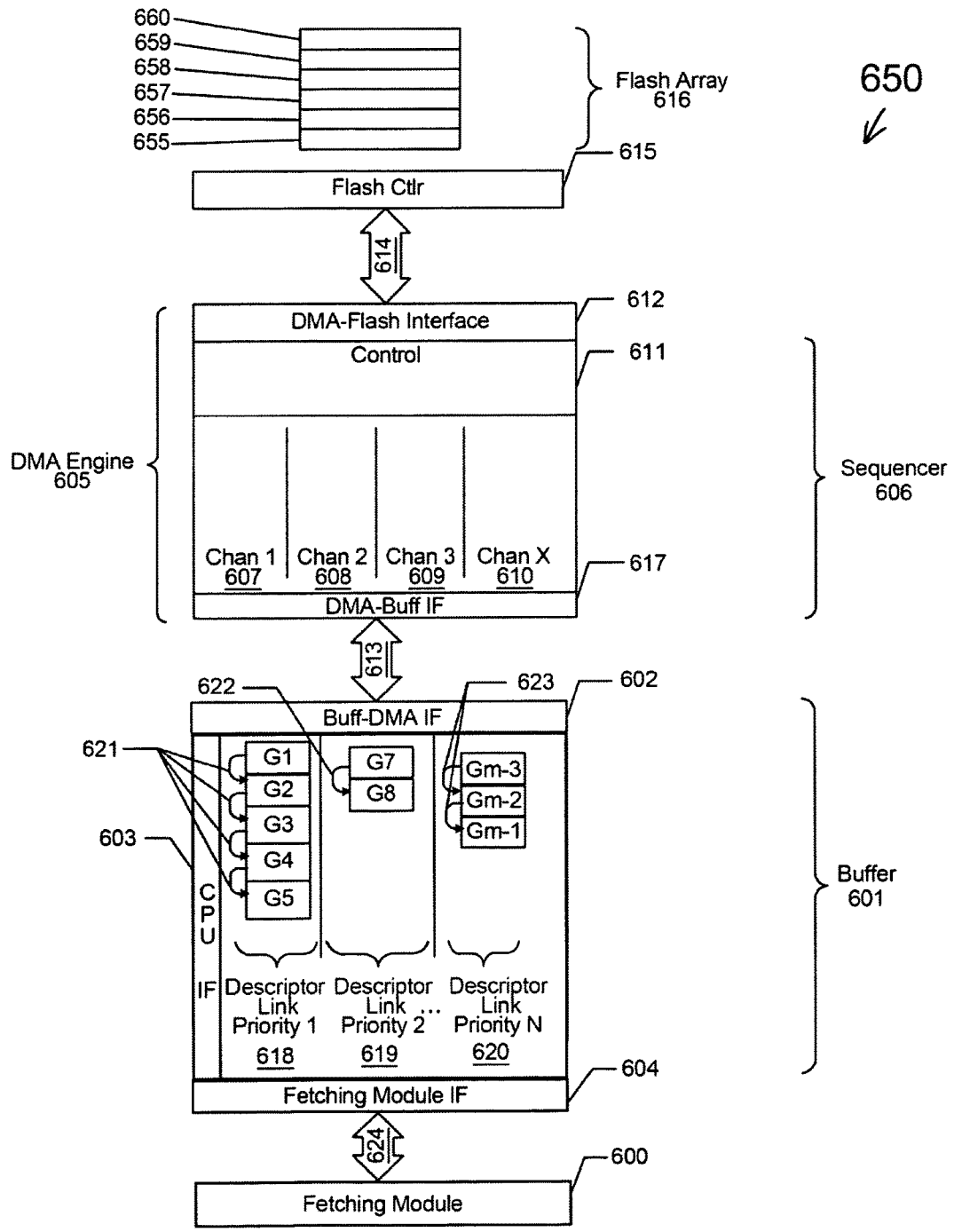
FIG. 6a and FIG. 6b are detailed diagrams on the stages of manipulating the DQGs including the transfer from the buffer to the sequencer, the sequencer mechanism of handling the DQGs, and the execution of the DQGs to perform the operation on a single DMA Engine according to an embodiment of the invention.
Figure 6B:
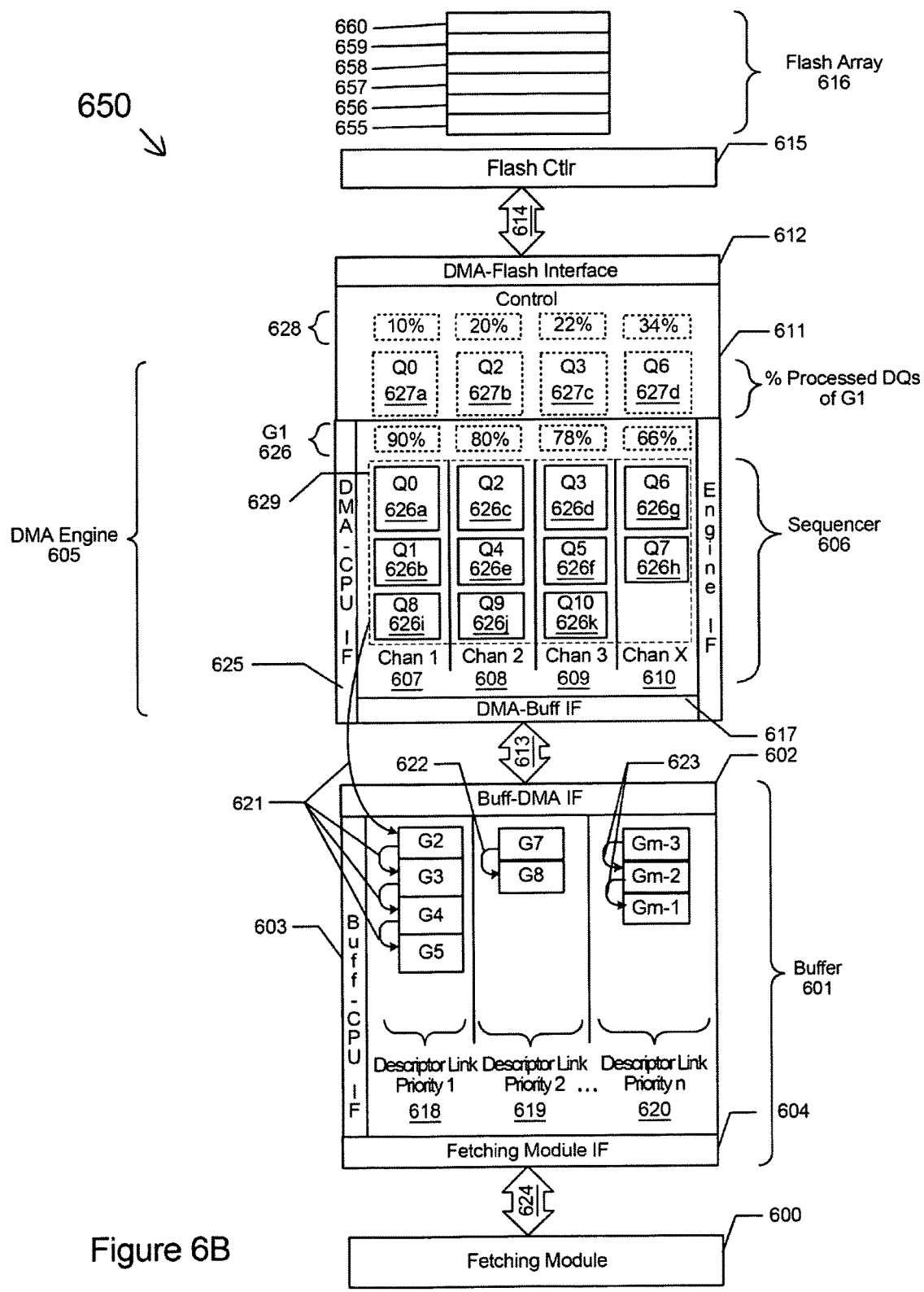

FIG. 6a and FIG. 6b are detailed diagrams on the stages of manipulating the DQGs including the transfer from the buffer to the sequencer, the sequencer mechanism of handling the DQGs, and the execution of the DQGs to perform the operation on a single DMA Engine according to an embodiment of the invention.

FIG. 6a is a system 650 illustrating an example of the flow of the descriptors from the buffer 601 to the DMA Engine 605 and showing the initial stage on how the information illustrated in FIG. 3 controls the flow and sequence between the buffer 601 and the DMA engine 605. The diagram of the system 650 shows (1) a fetching module 600, (2) a single buffer 601 having the Buffer-to-DMA engine interface 602, processor interface 603, and Fetching module interface 604; (3) a DMA Engine 605 that comprises a sequencer 606 (descriptor management unit 606) that is subdivided into a plurality of Descriptor Channels (e.g., Channel 1 607, Channel 2 608, Channel 3 609, and up to Channel X 610, wherein X is an integer) and Control Circuit 611 with a DMA-Flash Interface 612; (4) a Flash Controller 615; and (5) one set of Flash Array 616.

The fetching module 600 is coupled via bus 624 to the fetching module interface 604 of the buffer 601. The buffer-DMA interface 602 of the buffer 601 is coupled via bus 613 to the DMA-Buffer interface 617 of the DMA engine 605. The DMA-Flash interface 612 of the DMA engine 605 is coupled via Flashbus protocol or other bus IO standard protocol (e.g., PCIe) 614 to the flash controller 615. The flash controller 615 performs access to flash devices in the flash array 616 and performs reading of data from and writing of data to the flash devices in the flash array 616.

The Fetching module 600, independent of the descriptor processing of the DMA engine 605, continuously retrieves the descriptors, and monitors and fills up the buffer 601 via the Fetching Module Interface 604 until the buffer 601 is full. Inside the Buffer 601, the descriptor queue groups are segregated according to priority. For example, the descriptor queue groups G1, G2, G3, G4, and G5 are segregated or included in the descriptor link 618 with Priority 1. The descriptor queue groups G7 and G8 are segregated or included in the descriptor link 619 with Priority 2. The descriptor queue groups Gm-1, Gm-2, and Gm-3 are segregated or included in the descriptor link 620 with Priority n wherein n is an integer. Therefore, each of the descriptor links in the buffer 601 has a different corresponding priority value.

Based on the Group Link information (e.g., group link information 303 in FIG. 3), G1 to G5 are fetched 621, G7 to G8 are fetched 622, and Gm-3 to Gm-1 are fetched 623, with these fetched Descriptor Queue Groups forming atomic links together to perform a series of DMA Operations. Typically the group link information is meta data or control data that will permit at least one DQG to be linked to another DQG or to be linked to a plurality of DQGs. The descriptor groups are atomically interlinked as shown by the different linked descriptor queue groups 621, 622, and 623 to allow fetching without any intervention from the processor. A CPU Intervention including abort or suspend commands may stop the fetching between Descriptor Links only.

Based on the sequence information (e.g., sequence information 302 in FIG. 3) in each descriptor queue group (DQG), each set of descriptor queue groups is categorized to Descriptor Link Priority 1 (link 618), Descriptor Link Priority 2 (link 619), and up to Descriptor Link Priority n (line 620), wherein n is an integer, in order to determine which atomic Descriptor link will be serviced first by a DMA Engine. Therefore, each of the descriptor links 618, 619, and 620 have priority values 1, 2, and n, respectively, wherein the respective priority values of the descriptor links differ and wherein the highest to lowest priority are priority 1, priority 2, and priority n, so that the DMA engine 605 will service the descriptor link first, and then will service descriptor link 619 and then will service descriptor link 620. Like the group link information, the sequence information and descriptor group tag number (e.g., descriptor group tag number 301) are each meta data or control data.

FIG. 6b is a system 650 illustrating the activation of the DMA Engine 605 and Descriptor Queue Group dissection and processing. The DMA Engine 605, which when activated via the DMA-CPU interface 603 or via the DMA-Buff interface 604, starts two major sections to perform major roles in the DMA engine 605. These sections are: (1) the sequencer 606 which has the capability to retrieve the Descriptor Queue Groups in the Buffer 601 via the DMA-Buff interface 617, monitors any processor intervention via The DMA-CPU interface 625, extracts the Descriptor Queues in the Descriptor Queue Groups and re-arranges the descriptor queues as the sequence before the execution (processing) of the descriptor queues in the respective channels 607~610, and performs hardware abort and/or suspend or priority re-arrangement; and (2) The control section 611 which is responsible for the execution of the Descriptor Queues, and for manipulating the control signals to the Flash Controller 615.

In FIG. 6b, the DMA engine 625 is subdivided into X channels 607~610 wherein X is an integer. These channels are formulated for concurrent processing of the Descriptor Queues (DQs) to perform striping and interleaving of the Flash devices as discussed, for example, in commonly-owned and commonly-assigned U.S. patent application Ser. No. 14/217,249 which is entitled SCATTER-GATHER APPROACH FOR PARALLEL DATA TRANSFER IN A MASS STORAGE SYSTEM and in commonly-owned and commonly-assigned U.S. Patent Application No. 61/980,628 which is entitled SCATTER-GATHER APPROACH FOR PARALLEL DATA TRANSFER IN A MASS STORAGE SYSTEM.

In this example as shown in FIG. 6b, Descriptor Queue Group 1 (G1) 626 is the first group of Descriptor Link Priority 1 (link 618 with Priority 1) being serviced in the sequencer 606. The Descriptor Queue Group 1 (G1) 626 comprises Descriptor Queues Q0 to Q10 (descriptor queues 626a~626k) are extracted, and re-arranged in the respective channels 607~610 and processed in the DMA engine 605. For example, descriptor queues (Q0) 626a, (Q1) 626b, and (Q8) 626i are re-arranged in the channel 607. Descriptor queues (Q2) 626c, (Q4) 626e, and (Q9) 626j are re-arranged in the channel 608. Descriptor queues (Q3) 626d, (Q5) 626f, and (Q10) 626k are re-arranged in the channel 609. Descriptor queues (Q6) 626g and (Q7) 626h are re-arranged in the channel 610. Descriptor queues (Q0) 627a, (Q2) 627b, (Q3) 627c, and (Q6) 627d are decoded and arbitrated in the control section 611 based on the availability of the target flash device (e.g., flash device 655) in a single Flash array 616. For example, the single flash array 616 comprises a plurality of flash devices such as flash devices 655, 656, 657, 658, 659, and 660. The flash devices in a flash array 616 may vary in number. These partly processed DQs 627a~627d and the unprocessed DQs 626a, 626c, 626d, 626g are represented by the percentage values 628 at the Control Section 611 in their respective channels 607, 608, 609, and 610. The pending DQs 626b, 626e, 626f, 626h, 626i, 626j, and 626k are lined up per channel waiting to be processed and are represented by the percentage values 629 in their respective channels 607, 608, 609, and 610. These pending DQs can be aborted, suspended, and re-prioritized on-the-fly via the CPU interface 625.

Figure 7:
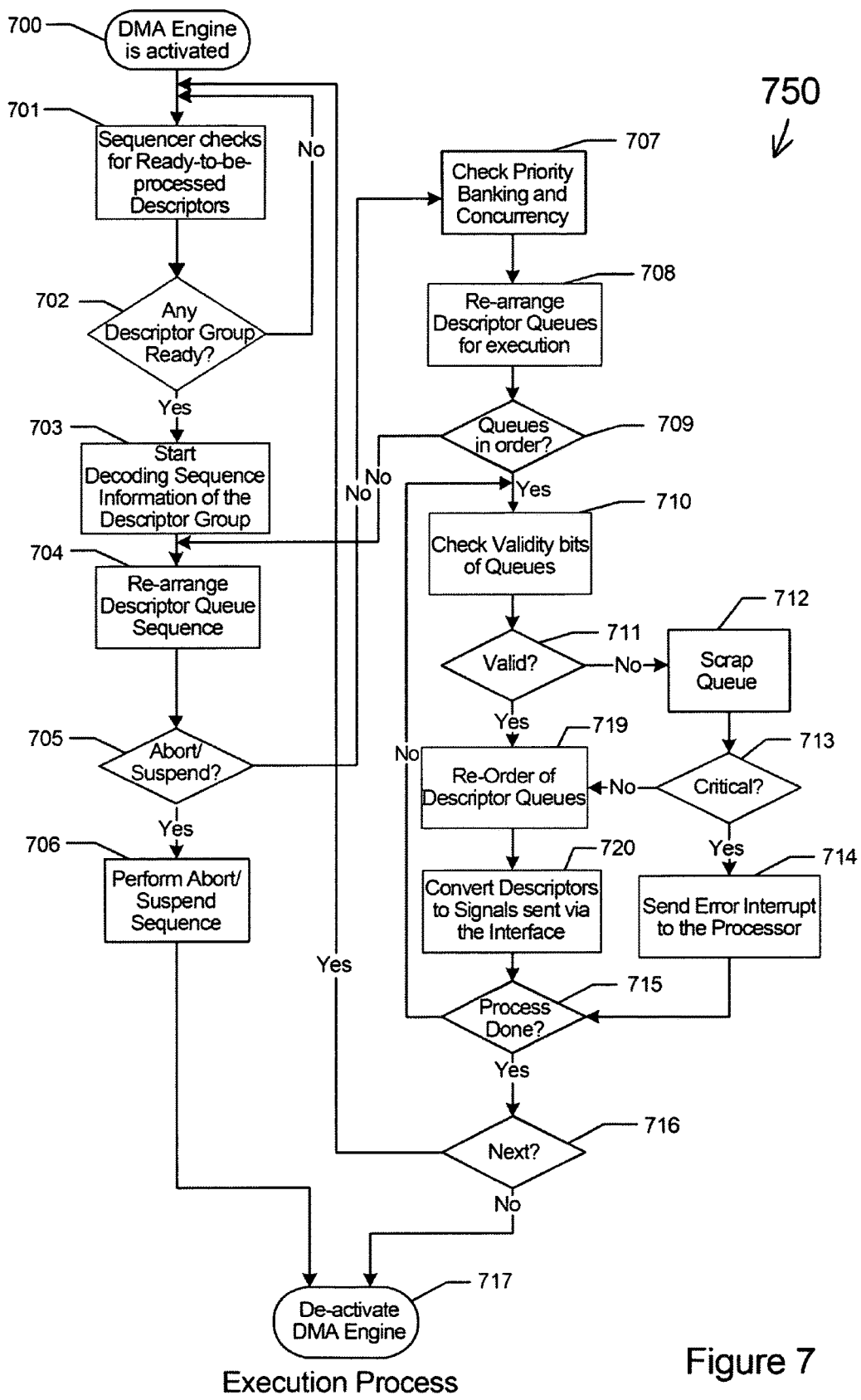
FIG. 7 is diagram of an algorithm on the manipulation of the DQGs from the alteration of the sequence of DQGs to the execution of these descriptors according to an embodiment of the invention.

FIG. 7 is a flow chart representation diagram of an algorithm 750 of a descriptor flow in the DMA engines according to an embodiment of the invention. This algorithm 750 shows the manipulation of the DQGs from the alteration of the sequence of DQGs to the execution of these descriptors.

Reference is now made to FIGS. 6a and 6b and FIG. 7. At 700, the DMA engine 605 is activated. Once the DMA engine is activated, at 701, the sequencer 606 (of the DMA engine 605) checks if there are Descriptor Queue Groups atomically linked to be fetched in the buffer 601. Therefore, at 701, the sequencer 606 checks the buffer 601 for ready-to-be-processed descriptors.

At 702, the sequencer 606 continuously fetches all the linked Descriptor Queue Groups in the buffer 601 until the sequencer 606 reads an end-of-link information (e.g., end-of-link information 323 in FIG. 3) in a DQG that the sequencer 606 is reading. At 702, the sequencer 606 checks the descriptor queue groups to determine if a given descriptor queue group is ready to be decoded, and the presence of the end-of-link information in the given DQG indicates that the DQG is ready to be decoded and processed. At 702, if no DQG is ready to be decoded, then the sequencer 606 continues to check for ready-to-be-processed descriptors at 701. At 702, if the sequencer 606 determines that a given DQG is ready to be decoded, then the sequencer 606 will start to decode that given DQG at 703.

While the sequencer 606 is fetching the rest of the descriptor group queues within a given descriptor link, at 703, the sequencer 606 starts to decode the sequence information of the descriptor group, and at 704, the sequencer 606 rearranges the sequence of the descriptor queues, and performs filling up of the channels 607~610 with descriptor queues in preparation for execution of the descriptors by the DMA engine 605.

At 705, the sequencer 606 also monitors any on-the-fly abort or suspend issued by the either software or processor or hardware (e.g., any of processors 139~141 or any of I/O devices 139~141). At 705, if an abort or suspend is issued, then at 706, the sequencer 606 performs an abort sequence or suspend sequence, respectively, before de-activation. At 717, the DMA engine 605 is de-activated. At 705, if an abort is not issued and if a suspend is not issued, then at 707, the sequencer 606 checks the priority ranking and concurrence of the descriptor links (by checking the sequence information 302 and group link information 303 in a given DQG 300), and at 708, the sequencer 606 re-arranges the descriptor queues for execution.

At 709, the sequencer 606 checks if the descriptor queues are in order after rearranging the descriptor queues. At 709, if the descriptor queues are not in order, then the sequencer 606 then arranges the sequences of the descriptor queues as performed in the operations at 704 and the sequencer 606 continues to check for any issued abort or suspend at 705. At 709, if the descriptor queues are in order, then at 710, the sequencer 606 checks the validity of bits in the descriptor queues. At 711, if the descriptor queue bits are found invalid (not valid), then at 712, the sequencer 606 will not process the descriptor queue. At 711, if the descriptor queue bits are found valid, then the sequencer 606 will perform the operations at 719 and 720 as discussed below.

At 712, after the sequencer 606 scraps the descriptor queue, then at 713, the sequencer 606 checks if the descriptor queue is critical. At 713, if the descriptor queue is critical, then at 714, the sequencer 606 informs the processor by sending an error interrupt to the processor before de-activating the DMA engine. At 713, if the descriptor queue is non-critical, then at 719, the sequencer 606 performs a re-order of the Valid Descriptor Queues and processes the valid descriptor queues in order to perform DMA operations. At 720, the sequencer 606 converts the descriptors (in the descriptor queues) to signals that are sent via DMA-flash interface 612 (FIG. 6b) to permit DMA operations.

At 715, the sequencer 606 continues to perform validity checking of bits in the descriptor queues as performed at 710 and processing of the descriptors until the whole process of executing the descriptors is done. At 715, if the process of executing the descriptors is not yet done, then the sequencer 606 continues to perform validity checking of bits in the descriptor queues as performed at 710 and processing of the descriptors until the whole process of executing the descriptors is done. At 715, if the process of executing the descriptors is done, then at 716, the sequencer 606 then checks for the availability of the next set of linked queue descriptor groups, and performs the sequencing and processing procedure at 701 and subsequent operations in the method 750 as discussed above, until there are no more descriptor queues to be fetched from the buffer 601 and no more descriptor Queues to process. At 716, if there are no more descriptor queues to be fetched from the buffer 601 and to be processed, then at 717, the DMA Engine 605 then de-activates and waits for the next activation signal to activate the DMA engine 605.

Figure 8:
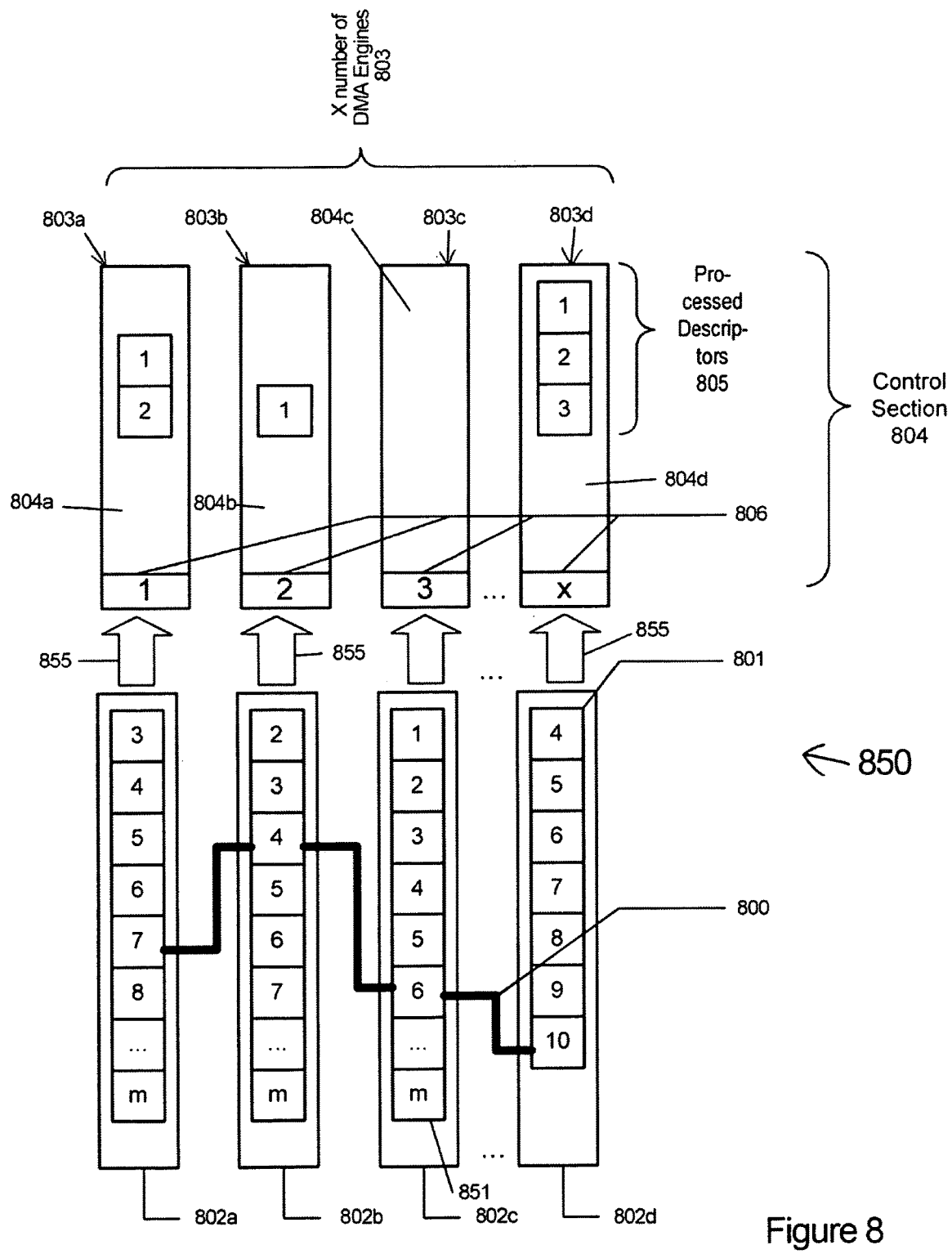
FIG. 8 is a block diagram illustrating a linking mechanism according to an embodiment of the invention.

FIG. 8 is a block diagram illustrating a linking mechanism according to an embodiment of the invention. This linking mechanism in system 850 is a type of atomic linking 800 for multiple DMA engines 803 (e.g., DMA engines 803a~803d) via the sequencers 802a~802d. There can be an X number of DMA engines 803 wherein X is an integer. The Sequence Link Information based on FIG. 3 (see, e.g., sequence link information 307, 312, or 317) of each descriptor queue 801 can be across different DMA engines 803. As discussed with reference to FIG. 3 above, a sequence link information in a descriptor queue will link a descriptor to another descriptor or to a plurality of descriptors. This type of link capability establishes a communication link and synchronization between multiple DMA Engine operations. Command dependencies between pluralities of DMA engines could then be implemented as an application to the aforementioned link capability. Atomic linking 800 comprising descriptor 7 in 802a, descriptor 4 in 802b, descriptor 6 in 802c and descriptor 10 in 802d may mean any of the ff. depending on the configuration (only to illustrate atomic linking 800, should not be limited to the scenarios below):

1. The above mentioned descriptors are started/ended concurrently, in sequence, or in other predefined manner.

For example, CONCURRENT START Mode. the DMA engine associated with descriptor 7 of 802a will only start execution if the DMA engines associated with descriptor 4 in 802b, descriptor 6 in 802c and descriptor 10 in 802d are also ready to start executing those aforementioned descriptors.

For example, CONCURRENT END Mode. The DMA engine executing descriptor 7 of 802a will only declare DONE if the DMA engines associated with descriptor 4 in 802b, descriptor 6 in 802c and descriptor 10 in 802d are also ready to declare DONE executing those aforementioned descriptors.

For example, SEQUENTIAL Mode. Start and finish execution of descriptor 7 of 802a, then start and finish execution of descriptor 4 in 802b, then start and finish execution of descriptor 6 in 802c and lastly start and finish execution of descriptor 10 in 802d.

Descriptor 8 in 802a, descriptor 5 in 802b, descriptor 7 in 802c will not be able to start execution unless all the descriptors in Atomic link 800 has finished execution.

Once any of the descriptors within the atomic link 800 start executing, no descriptor not belonging to the atomic link 800 will be allowed to execute until all descriptors under atomic link 800 have _started_ executing, regardless of the DMA engine.

Once any of the descriptors within the atomic link 800 start executing, no descriptor not belonging to the atomic link 800 will be allowed to execute until all descriptors under atomic link 800 have _ended_ executing, regardless of the DMA engine.

Descriptor sequence per DMA engine may or may not be rearranged to prioritize the descriptors belonging to atomic linking 800.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless.

It is also within the scope of the present invention to implement a program or code that can be stored in a non-transient machine-readable (or non-transient computer-readable medium) having stored thereon instructions that permit a method (or that permit a computer) to perform any of the inventive techniques described above, or a program or code that can be stored in an article of manufacture that includes a non-transient computer readable medium on which computer-readable instructions for carrying out embodiments of the inventive techniques are stored. Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
    fetching, by a fetching module, a first set of descriptors from a memory device and writing, by the fetching module, the first set of descriptors to a buffer;
    retrieving the first set of descriptors from the buffer and processing the first set of descriptors to permit a Direct Memory Access (DMA) operation;
    checking, by the fetching module, if space is available in the buffer; and
    if space is available in the buffer, fetching, by the fetching module, a second set of descriptors from the memory device and writing, by the fetching module, the second set of descriptors to the buffer during or after the processing of the first set of descriptors;
    wherein the first set of descriptors are fetched from the memory device until an end-of-the-link information is detected in the first set.

2. The method of claim 1, further comprising:
writing the first set and second set of descriptors into the memory device prior to fetching the first set and the second set from the memory device.

3. The method of claim 1, further comprising:
segregating descriptor queue groups into a plurality of descriptor links in the buffer and wherein each of the descriptor links has a different corresponding priority value;
wherein each descriptor queue group comprises a plurality of descriptor queues and wherein each descriptor queue comprises a plurality of descriptors.

4. The method of claim 1, further comprising:
using a group link information to link a plurality of descriptor queue groups.

5. The method of claim 1, further comprising:
using a sequence information to categorize a plurality of descriptor queue groups into a plurality of descriptor links, wherein each descriptor link has a different corresponding priority value.

6. The method of claim 1, further comprising:
extracting descriptor queues in a plurality of descriptor queue groups and re-arranging the descriptor queues as a sequence before execution of the descriptor queues in respective channels.

7. The method of claim 1, further comprising:
processing at least one of the descriptors in a plurality of Direct Memory Access (DMA) engines.

8. The method of claim 1, comprising:
using a sequence link information in a descriptor queue group to link a plurality of descriptors.

9. An apparatus, comprising:
a fetching module configured to fetch a first set of descriptors from a memory device and to write the first set of descriptors to a buffer;
a sequencer configured to retrieve the first set of descriptors from the buffer and to process the first set of descriptors to permit a Direct Memory Access (DMA) operation;
wherein the fetching module is configured to check if space is available in the buffer; and
wherein if space is available in the buffer, the fetching module is configured to fetch a second set of descriptors from the memory device and to write the second set of descriptors to the buffer during or after the processing of the first set of descriptors;
wherein the fetching module is configured to fetch the first set of descriptors from the memory device until an end-of-the-link information is detected in the first set.

10. The apparatus of claim 9, further comprising:
a processor configured to write the first set and second set of descriptors into the memory device prior to the fetching module fetching the first set and the second set from the memory device.

11. The apparatus of claim 9, wherein the sequencer is configured to segregate descriptor queue groups into a plurality of descriptor links in the buffer and wherein each of the descriptor links has a different corresponding priority value;
wherein each descriptor queue group comprises a plurality of descriptor queues and wherein each descriptor queue comprises a plurality of descriptors.

12. The apparatus of claim 9 wherein the sequencer is configured to use a group link information to link a plurality of descriptor queue groups.

13. The apparatus of claim 9, wherein the sequencer is configured to use a sequence information to categorize a plurality of descriptor queue groups into a plurality of descriptor links, wherein each descriptor link has a different corresponding priority value.

14. The apparatus of claim 9, wherein the sequencer is configured to extract descriptor queues in a plurality of descriptor queue groups and to re-arrange the descriptor queues as a sequence before execution of the descriptor queues in respective channels.

15. The apparatus of claim 9, wherein the sequencer comprises a plurality of sequencers, wherein each sequencer is in a different respective Direct Memory Access (DMA) engine, wherein each of the plurality of sequencers is configured to process at least one of the descriptors.

16. The apparatus of claim 9, wherein the sequencer comprises a plurality of sequencers, wherein the plurality of sequencers are configured to use a sequence link information in a descriptor queue group to link a plurality of descriptors.

17. An article of manufacture, comprising:
a non-transitory computer-readable medium having stored thereon instructions operable to permit an apparatus to perform a method comprising:
fetching, by a fetching module, a first set of descriptors from a memory device and writing, by the fetching module, the first set of descriptors to a buffer;
retrieving the first set of descriptors from the buffer and processing the first set of descriptors to permit a Direct Memory Access (DMA) operation;
checking, by the fetching module, if space is available in the buffer; and
if space is available in the buffer, fetching, by the fetching module, a second set of descriptors from the memory device and writing, by the fetching module, the second set of descriptors to the buffer during or after the processing of the first set of descriptors;
segregating descriptor queue groups into a plurality of descriptor links in the buffer and wherein each of the descriptor links has a different corresponding priority value;
wherein each descriptor queue groups comprises a plurality of descriptor queues and wherein each descriptor queue comprises a plurality of descriptors.

* * * * *